(12) United States Patent
Turner et al.

(10) Patent No.: US 12,173,569 B2
(45) Date of Patent: Dec. 24, 2024

(54) CONTINUOUS RECIRCULATION FOR SEPARATION OF FLUIDS PRODUCED DURING DRILL OUT AND FLOW BACK

(71) Applicant: CP Energy Services, Inc., Wilmington, DE (US)

(72) Inventors: Tracy Turner, Dallas, TX (US); Dennis Ray Poulson, Eufaula, OK (US)

( * ) Notice: Subject to any disclaimer, the term of this patent is extended or adjusted under 35 U.S.C. 154(b) by 0 days.

(21) Appl. No.: 18/785,174

(22) Filed: Jul. 26, 2024

(65) Prior Publication Data

US 2024/0384613 A1 Nov. 21, 2024

Related U.S. Application Data

(63) Continuation-in-part of application No. 18/484,666, filed on Oct. 11, 2023, which is a continuation of
(Continued)

(51) Int. Cl.
*E21B 21/06* (2006.01)
*B01D 19/00* (2006.01)
(Continued)

(52) U.S. Cl.
CPC ........ *E21B 21/065* (2013.01); *B01D 19/0068* (2013.01); *B01D 21/003* (2013.01); *B01D 21/10* (2013.01); *B01D 45/16* (2013.01); *B01D 47/10* (2013.01); *B01D 50/40* (2022.01); *B03B 9/02* (2013.01); *E21B 21/067* (2013.01); *B01D 2221/04* (2013.01); *B65G 33/24* (2013.01); *C10G 7/04* (2013.01)

(58) Field of Classification Search
CPC . E21B 21/065; E21B 21/067; B01D 19/0068; B01D 21/003; B01D 21/10; B01D 45/16; B01D 47/10; B01D 50/40; B01D 2221/04; B03B 9/02; B65G 33/24; C10G 7/04
See application file for complete search history.

(56) References Cited

U.S. PATENT DOCUMENTS 2,331,102 A 10/1943 Bird et al.
3,605,910 A 9/1971 Deeter et al.
(Continued)

OTHER PUBLICATIONS

International Searching Authority, "Search Report and Written Opinion," issued in connection with PCT patent application No. PCT/US2021/071918, mailed on Feb. 23, 2022, 4 pages.

*Primary Examiner* — Brian A McCaig
(74) *Attorney, Agent, or Firm* — Scheef & Stone, L.L.P.; Keith C. Rawlins, Esq.

(57) ABSTRACT

One or two continuous recirculation loops are utilized for the well-site equipment that separates produced fluids into sand, liquid, and gas during drill out and flow back that occurs after fracturing a subterranean formation. When one recirculation loop is utilized, the recirculation loop continuously recirculates fluid between the recirculation chamber of the disclosed sand removal apparatus and a shaker device. When two recirculation loops are utilized, the first recirculation loop continuously recirculates fluid between a recirculation chamber of the disclosed sand removal apparatus and a shaker device, and the second recirculation loop continuously recirculates fluid between the recirculation chamber and a gas separator.

20 Claims, 10 Drawing Sheets

Related U.S. Application Data application No. 17/937,083, filed on Sep. 30, 2022, which is a continuation of application No. 17/073,992, filed on Oct. 19, 2020, now Pat. No. 11,492,859, which is a continuation-in-part of application No. 16/148,398, filed on Oct. 1, 2018, now Pat. No. 10,807,022.

(51) Int. Cl.
  B01D 21/00 (2006.01)
  B01D 21/02 (2006.01)
  B01D 45/16 (2006.01)
  B01D 47/10 (2006.01)
  B01D 50/40 (2022.01)
  B03B 9/02 (2006.01)
  B65G 33/24 (2006.01)
  C10G 7/04 (2006.01)

(56) References Cited

U.S. PATENT DOCUMENTS

| | | |
|---|---|---|
| 4,287,761 A | 9/1981 | Moffet et al. |
| 4,519,848 A | 5/1985 | Underwood |
| 4,784,757 A | 11/1988 | Nelson et al. |
| 5,236,605 A | 8/1993 | Warncke |
| 5,242,604 A | 9/1993 | Young et al. |
| 5,344,570 A | 9/1994 | Mclachlan et al. |
| 5,665,245 A | 9/1997 | Kloss et al. |
| 7,972,501 B2 | 7/2011 | Godlien |
| 8,449,779 B2 | 5/2013 | Thompson |
| 8,517,167 B2 | 8/2013 | Thompson |
| 9,498,739 B2 | 11/2016 | Thompson |
| 9,597,614 B2 | 3/2017 | Thompson |
| 9,687,761 B2 | 6/2017 | Thompson |
| 10,751,654 B1 | 8/2020 | Kulbeth |
| 10,807,022 B2 | 10/2020 | Bollom et al. |
| 11,492,859 B2 | 11/2022 | Bollom et al. |
| 11,634,953 B1 | 4/2023 | Kulbeth |
| 2008/0006304 A1 | 1/2008 | Treherne et al. |
| 2009/0236144 A1 | 9/2009 | Todd et al. |
| 2009/0277632 A1 | 11/2009 | Frazier |
| 2012/0211281 A1 | 8/2012 | King |
| 2012/0216416 A1 | 8/2012 | Hollier et al. |
| 2012/0325751 A1 | 12/2012 | Renick et al. |
| 2013/0220891 A1* | 8/2013 | Newman .................. B03B 9/02 210/259 |
| 2013/0284023 A1 | 10/2013 | Ratto |
| 2013/0284026 A1 | 10/2013 | Warncke |
| 2015/0047906 A1 | 2/2015 | Serda, Jr. |
| 2018/0193773 A1 | 7/2018 | Thompson |
| 2019/0211501 A1 | 7/2019 | Meddoff |
| 2020/0101403 A1 | 4/2020 | Bollom et al. |
| 2023/0025841 A1 | 1/2023 | Bollom et al. |
| 2024/0035346 A1 | 2/2024 | Bollom et al. |

* cited by examiner

CONTINUOUS RECIRCULATION FOR SEPARATION OF FLUIDS PRODUCED DURING DRILL OUT AND FLOW BACK

CROSS-REFERENCE TO RELATED APPLICATIONS

The present application is a continuation-in-part of U.S. patent application Ser. No. 18/484,666, filed on Oct. 11, 2023, which is a continuation of U.S. patent application Ser. No. 17/937,083, filed Sep. 30, 2022, which is a continuation of U.S. patent application Ser. No. 17/073,992, filed Oct. 19, 2020, (now U.S. Pat. No. 11,492,859, issued Nov. 8, 2022), which is a continuation-in-part of U.S. patent application Ser. No. 16/148,398, filed Oct. 1, 2018, (now U.S. Pat. No. 10,807,022, issued Oct. 20, 2020), all of which are incorporated by reference in their entirety.

FIELD OF THE DISCLOSURE

The present disclosure generally relates to oil and gas operations, and more particularly, to the separation of fluids produced during drill out and flow back.

BACKGROUND

In oil and gas operations, a fracturing operation involves pumping a fluid under a fracturing pressure into a subterranean formation via a wellbore to "fracture" the rock of the subterranean formation. The fracturing creates fluid pathways through which hydrocarbons (e.g., in the form of oil and/or gas) may flow out of the rock to the wellbore. The pumped fluid can include water, proppant (e.g., sand), and in some cases one or more additives which are used to enhance the chemistry of the formation or fluid properties to optimize fracturing and subsequent hydrocarbon production.

Fracturing operations can be performed in stages, e.g., in a zones of the wellbore. The zone are created by placed plugs in the wellbore. After the fracturing operation is completed, the plugs are removed so that production can begin. Removal of the plugs is called drill out because drilling equipment is used to break the plugs into pieces so that fluids upstream of the plug (further downhole) can flow up the wellbore and into production lines. During drill out, the fluid produced includes the water and proppant used for fracturing, as well as pieces of the plugs that are drilled out. Hydrocarbons from the formation and any additives that were used in the pumped fluid can also be produced with the water and proppant. After the plugs are drilled out, the produced fluids can continue to flow out of the wellbore (in a flow back phase) to continue removal of the water and proppant from the formation. During the flow back phase, the fluid produced, like the fluid produced during drill out, includes water and proppant, and any remnant pieces of plugs that were not already produced. The fluid during flow back phase can also include hydrocarbons and any additives used for fracturing. The proportion of the fluid produced during flowback that is hydrocarbons can slowly increase until a suitable level of hydrocarbons is contained in the produced fluid to place the well into testing and/or production.

The produced fluid recovered from the well during the drill out and flowback phases typically must be disposed of in an environmentally friendly manner. In some cases, the produced fluid is subjected to separation of any gases and then the liquids and sand can be stored for future operations. Recycling the water and sand involves separating the sand from the water and well fluids (e.g., hydrocarbon gas, hydrocarbon liquids, additives, or combinations thereof) and then separating the water from the well fluids. The latter step may also include separating the gas from the oil so that these components may be recovered.

Separators can be used to separate sand from gas and/or liquids in fluids during drill out and flow back.

There is an ongoing need for separators that have minimal rig-up times while improving the efficiency and effectiveness of separating the fluid produced during drill out and/or flow back into component parts.

SUMMARY

Disclosed is a process including: receiving a sand removal feed including sand and water into a first mixture contained in a hopper; flowing a first portion of the first mixture from the hopper to a diffuser; flowing a second portion of the first mixture from the hopper into a second mixture including sand and water that is contained in a recirculation chamber; flowing a first portion of the second mixture from the recirculation chamber to the diffuser; flowing a second portion of the second mixture to a gas separator; flowing a diffuser mixture including the first portion of the first mixture and the first portion of the second mixture from the diffuser to a shaker device; and flowing a shaker recycle liquid from the shaker device to the hopper.

Also disclosed is a system including: a hopper having an interior configured to contain a first mixture including sand and water, wherein the hopper has a hopper bottom outlet positioned on a bottom portion of the hopper; a recirculation chamber having an interior configured to contain a second mixture including sand and water, a first outlet positioned on a bottom portion of the recirculation chamber, and a second outlet positioned on the bottom portion of the recirculation chamber; a diffuser having a diffuser inlet fluidly coupled the hopper bottom outlet of the hopper and to the first outlet of the recirculation chamber, wherein the diffuser has a diffuser outlet; and a shaker device positioned at least partially below the diffuser and at least partially above the hopper.

Disclosed is another process including: continuously recirculating sand and water in a first continuous recirculation loop, wherein the first continuous recirculation loop includes: i) a first fluid path formed between a hopper and a recirculation chamber, ii) a second fluid path formed between the hopper and a diffuser, iii) a third fluid path formed between the recirculation chamber and the diffuser, iv) a fourth fluid path formed between the diffuser and a shaker device, and v) a fifth fluid path formed between the shaker device and the hopper.

Disclosed is another process for operating a recirculation chamber of a sand removal apparatus, wherein the sand removal apparatus includes a hopper, a recirculation chamber, and a tank, the process including: receiving, by the recirculation chamber, a portion of a first mixture including sand and water that is contained in the hopper from the hopper into a second mixture including sand and water that is contained in a recirculation chamber; flowing a first portion of the second mixture from the recirculation chamber to a diffuser; flowing a second portion of the second mixture from the recirculation chamber to a gas separator; and optionally flowing a third portion of the second mixture from the recirculation chamber to the tank.

Disclosed is another process for operating a sand removal apparatus, wherein the sand removal apparatus comprises one or more recirculation chambers and a tank, the process comprising: receiving, by the one or more recirculation chambers, a gas removal feed from a gas separator into a mixture comprising sand and water that is contained in the one or more recirculation chambers; flowing a first portion of the mixture from the one or more recirculation chamber to a diffuser; flowing a second portion of the mixture from the one or more recirculation chambers to the gas separator; and optionally, flowing a third portion of the mixture from the one or more recirculation chambers to the tank.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

"Stream" or "line" refers to material components described that flow in the stream, and can include any pipe, conduit, connector, or combinations thereof that are included for transfer of a fluid from one location to another.

Disclosed herein are processes, systems, and apparatus that separate fluids produced during drill out and flow back into gas, sand, and liquids. Gas is first separated from the sand and liquids, and then the sand and liquids are separated from one another, utilizing one or two continuous recirculation loop(s) according to this disclosure.

A first loop of the continuous recirculation loops disclosed herein is contained in the sand removal apparatus of this disclosure. The first recirculation loop continuously circulates (or recirculates) fluid f1) from a recirculation chamber, a hopper, or both a recirculation chamber and a hopper of the disclosed sand removal apparatus to a diffuser of the sand removal apparatus, 2) from the diffuser to a shaker device of the sand removal apparatus, and 3) from the shaker device back to the hopper. The diffuser and the shaker device utilized in the first loop more efficiently dry the sand that is recovered by the sand removal apparatus than operation of sand removal without the first loop and/or without the diffuser and shaker device.

A second loop of the continuous recirculation loops disclosed herein is formed between the sand removal apparatus and the gas separator of the disclosure. The second recirculation loop continuously circulates (or recirculates) fluid from a recirculation chamber of the sand removal apparatus to a gas separator and back to the hopper of the sand removal apparatus.

The two loops can be utilized alone or in combination. When utilized in combination, the two loops share a common fluid pathway where fluid flows from the hopper of the sand removal apparatus to the recirculation chamber of the sand removal apparatus.

Figure 1A:
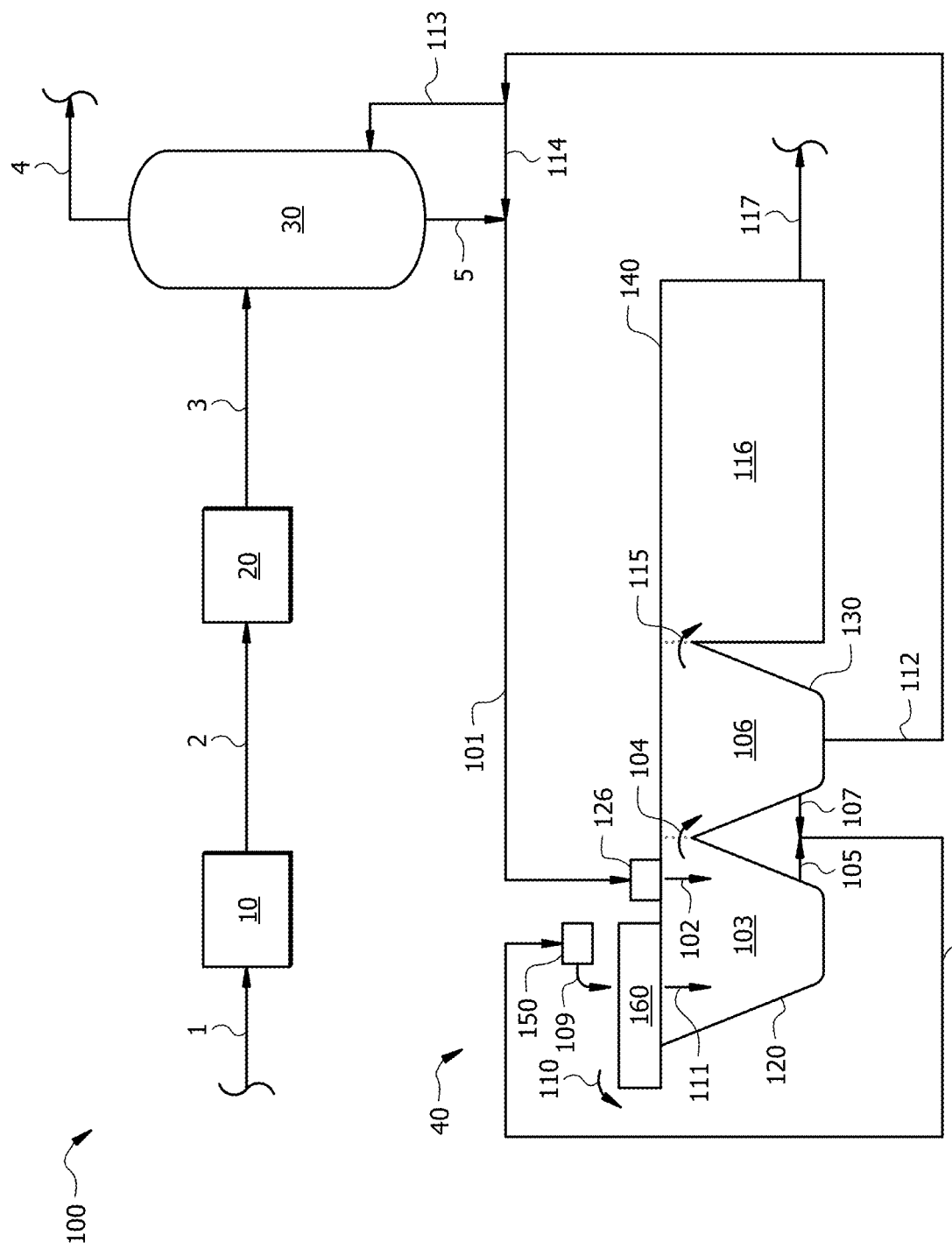
FIG. 1A illustrates a process flow diagram of a system having continuous recirculation for separation of fluids produced during drill out and flow back.

FIG. 1A illustrates a process flow diagram of a system 100 having continuous recirculation for separation of fluids produced during drill out and flow back. The system 100 can generally include equipment such as valves, sensors, flow meters, control devices that facilitate operation thereof.

The system 100 can include one or more of a plug catcher 10, a choke manifold 20, a gas separator 30, and a sand removal apparatus 40.

The plug catcher 10 is fluidly connected to a well stream 1. Stream 1 can include water and proppant (e.g., sand). In some cases, stream 1 can additionally include one or more additives (e.g., chemicals injected into the subterranean formation to alter a chemistry within the formation to enhance hydrocarbon recovery and/or fracturing) and/or hydrocarbons (e.g., crude oil, natural gases, condensates, or combinations thereof). The amount of water and sand in the well stream 1 can depend on the phase of operation, e.g., whether in the drill out phase or the flow back phase. The amount of water and sand can also vary over time during a phase, e.g., the amount of water and sand in the beginning of flow back phase can be greater than the amount of water and sand during the end of the flow back phase.

The plug catcher 10 receives the well stream 1 and separates large solids from the well stream 1 to produce stream 2 containing a wellbore fluid. For example, the plug catcher 10 can be used during drill out phase when zone isolation plugs are milled out to allow fluids to flow from a fractured subterranean formation to the surface via a wellbore. The wellbore fluid in well stream 1 flows to the plug catcher 10. The large solids removed by the plug catcher 10 can include the isolation plug pieces, and additionally, can include fragments of casing, rock fragments, or combinations thereof. Other solids, such as sand proppant, can be incidentally removed by the plug catcher 10 along with the large solids, with the understanding that sand is primarily allowed to pass through the screen(s) of the plug catcher 10 and is recovered downstream by the sand removal apparatus 40. An operating pressure of the plug catcher 10 can be in a range of from about 10,000 psia to 15,000 psia (68.9 MPaa to 103.4 MPaa), for example. The plug catcher 10 can be embodied as a single barrel with bypass or as a dual barrel plug catcher, for example. A screen in the plug catcher 10 acts as a filter that prevents large solids from passing through holes in the screen. The plug catcher 10 can include one or more valves connected on the large solids side of the screen, for intermittent or continuous removal of the large solids from the barrel of the plug catcher 10.

Stream 2 can include water and proppant (e.g., sand). In some cases, stream 2 can additionally include one or more additives (e.g., chemicals injected into the subterranean formation to alter a chemistry within the formation to enhance hydrocarbon recovery and/or fracturing) and/or hydrocarbons (e.g., crude oil, natural gases, condensates, or combinations thereof). The relative amounts of sand and water can vary over time depending on the phase of operation, similar to that described for well stream 1. In aspects, the pressure of the stream 2 can be in a range of from about 10,000 psia to 15,000 psia (68.9 MPaa to 103.4 MPaa), for example.

The choke manifold 20 can be fluidly connected to stream 2. The choke manifold 20 can receive stream 2 and control a flow of fluids received from stream 2 to produce stream 3 having a flow rate and pressure suitable for introduction into the gas separator 30. The choke manifold 20 can be embodied as a manifold assembly having chokes, valves, and pressure sensors to provide controlled flow of fluids in stream 3 that are received by the choke manifold 20 from stream 2. The choke manifold 20 can include flanged or integrated gate valves, positive chokes, and adjustable chokes, for example.

In some aspects, the choke manifold 20 can reduce the pressure of the fluids received from the stream 2 to a second pressure in stream 3, such that the pressure of stream 3 is lower than a pressure of stream 2. To the extent that pressure is reduced in the choke manifold 20, the outlet pressure of the choke manifold 20 is sufficient such that fluids flow by pressure differential to the gas separator 30.

Stream 3 can include the same components as described for stream 2. Stream 3 fluidly connects with an inlet of the gas separator 30.

Gas separator 30 is a vessel having an inlet connected to stream 3, a gas outlet connected to stream 4, and a slurry outlet connected to slurry discharge line 5. In aspects where the gas separator 30 is a vertical vessel, also referred to as a vertical separator that is oriented such that the longitudinal axis of the vessel is vertical, the inlet can be positions on a side wall thereof, the gas outlet can be position on a top portion of the vessel, and the slurry outlet can be positioned on a bottom portion of the vessel. In aspects where the gas separator 30 is a vertical vessel, the vessel can contain one or more angled baffles attached to the inner wall of the vessel inside the vessel that direct(s) liquids and sand (that are separated from gas) downwardly through the vessel to the slurry outlet. In aspects where the gas separator 30 is a horizontal vessel, also referred to as a horizontal separator that is oriented such that the longitudinal axis of the vessel is not vertical (e.g., the longitudinal axis is horizontal or at an angle less than 90° with respect to horizontal), the inlet can be positioned on an end of the horizontal vessel, the gas outlet can be positioned on the side wall (the part of the side wall that is the top of the vessel), and the slurry outlet can be positioned on the opposite end of the vessel on the part of the side wall that is the bottom of the vessel.

Stream 3 is received by the gas separator 30 via the inlet, and then gas separator 30 separates the components of stream 3 into i) a gas that is recovered in a gas product stream 4 that is connected to the gas outlet of the gas separator 30, and ii) a mixture of sand and liquids (e.g., a slurry) that is recovered in the slurry discharge line 5 that is connected to the slurry outlet of the gas separator 30.

In some embodiments, the gas separator 30 can be connected to a mobile structure (e.g., a support structure (skid frame) and chassis) that can be connected to the support structure of the sand removal apparatus 40, without requiring other supports or tie downs. In other embodiments, the gas separator 30 can be connected to a support structure that is separate from the support structure of the sand removal apparatus 40, without requiring connection to support structure of the sand removal apparatus 40 for support or tie downs. In other embodiments, the gas separator 30 can be placed alongside a pole truck, crane, or additional support vehicle without requiring its own support structure or tie-downs. In other embodiments, the gas separator 30 can be connected to the support structure of the sand removal apparatus 40, without requiring its own support structure or tiedowns.

In aspects, the gas separator 30 operates at a pressure of atmospheric pressure (14.7 psia; 101.3 kPaa at sea level) or a pressure above atmospheric pressure that facilitates flow of gas out of the gas separator 30 in stream 4. In aspects, the gas separator 30 can operate at a temperature resulting from no external heating or cooling applied to the vessel other than ambient air at the well site.

Gases (e.g., light hydrocarbons such as methane, ethane, propane, or combinations thereof; acid gas such as carbon dioxide and/or hydrogen sulfide) in gas product stream 4 can flow to scrubbing (e.g., for acid gas absorption), flaring, incineration, or scrubbing followed by flaring or incineration.

Fluid that is recirculated from the sand removal apparatus 40 (described in more detail herein) in stream 112 can be split into a first portion in stream 113 and a second portion in stream 114. Stream 113 can connect to the side wall of the gas separator 30 at an angle relative to the side wall so that the flow of the first portion provides a motive force for rotation of the slurry in the gas separator 30. The rotation can prevent separation of sand and water, for example, in the bottom of the vessel. The second portion in stream 114 can flow perpendicularly relative to the flow of slurry in slurry discharge line 5 and may create a Venturi effect (e.g., pressure vacuum) that pulls the slurry from gas separator 30 via the slurry discharge line 5 to combine with the second portion, forming the sand removal feed 101. The sand removal feed 101 flows to the sand removal apparatus 40. The sand removal feed 101 can also be referred to as a recirculation loop feed in embodiments where one or both of continuous recirculation loop 200 and the continuous recirculation loop 300 is utilized in the process and sand removal apparatus 40.

The sand removal apparatus 40 can include one or more of a hopper 120, a recirculation chamber 130, a tank 140, a diffuser 150, a shaker device 160. While not drawn in FIG. 1A, each of the hopper 120, the recirculation chamber 130, the tank 140, the diffuser 150, and the shaker device 160 can be connected to a support structure to form a single mobile unit that can be transported to a well-site without need for load permit and that enables movement of the entire sand removal apparatus 40 from location to location without disassembly of the sand removal apparatus 40. After arriving at the well-site, the rig-up time of the sand removal apparatus 40 can be less than 2 hours.

In aspects, the sand removal apparatus 40 operates at a pressure of atmospheric pressure (14.7 psia; 101.3 kPaa at sea level) and a temperature resulting from no external heating or cooling applied to the sand removal apparatus 40 other than ambient air at the well site and any warming that may be caused by operating the equipment disclosed herein (e.g., pumps).

The hopper 120 is part of one or more recirculation loops disclosed herein.

Thus, the hopper 120 can also be referred to as a receiving hopper, recirculation hopper, or recirculation chamber. The top of the hopper 120 is fluidly communicated or coupled to an end of the sand removal feed 101. The hopper 120 has angled side walls (e.g., that are attached to a support structure of the apparatus 40) such that a top of the hopper 120 is open to the atmosphere and a bottom of the hopper 120 is closed (except for the hopper outlet described herein). In operation, the hopper 120 contains a first mixture 103 (a slurry of sand and water). The first mixture 103 is a combination of the slurry that the hopper 120 receives from the sand removal feed 101 and shaker recycle liquid 111 that the hopper receives from the shaker device 160. In some embodiments, a discharge port 126 can be placed above a portion of the hopper 120 and below an outlet of the sand removal feed 101 to direct the sand removal feed 101 downward into the hopper 120 as slurry 102 to become part of the first mixture 103.

The recirculation chamber 130 is also part of one or more recirculation loops disclosed herein. In aspects, the recirculation chamber 130 is a single chamber positioned between the hopper 120 and the tank 140; or in alternative aspects, the recirculation chamber 130 can be embodied as a series of recirculation chambers positioned side-by-side between the hopper 120 and the tank 140. The recirculation chamber 130 has angled side walls (e.g., that are attached to a support structure of the apparatus 40) such that a top of the recirculation chamber 130 is open to the atmosphere and a bottom of the recirculation chamber 130 is closed (except for the outlet(s) described herein). In operation, the recirculation chamber 130 contains a second mixture 106 of sand and liquid that is a portion 104 of the first mixture 103 that the recirculation chamber 130 receives from the hopper 120.

The tank 140 receives a portion 115 of the second mixture 106 from the recirculation chamber 130 into a third mixture 116 contained in the tank 140. The tank 140 can have any structured configuration, such as a box like structure having vertical side walls, or angled side walls such as those described for the hopper 120 or recirculation chamber 130. In some embodiments, sand and other solids accumulate on a bottom of the tank 140 such that the stream 117 contains less than 1 wt % sand based on a total weight of stream 117. In aspects of operation of the sand removal apparatus 40, the tank 140 is not a recirculation chamber, in that, the liquids that flow from the tank 140 in stream 117 are not recirculated back to the sand removal apparatus 40. In some aspects of operation of the sand removal apparatus 40, the tank 140 can be periodically flushed with water to remove accumulated sand on the bottom of the tank 140. In these aspects, the tank 140 can be transformed into a recirculation chamber for the flush, in that, as is described in more detail for FIG. 4A, a portion of the accumulated sand in the tank 140 can be flushed into one of the continuous recirculation loops that send the accumulated to the shaker device 160 for removal from the sand removal apparatus 40.

In aspects, a concentration of sand in the first mixture 103 is greater than a concentration of sand in the second mixture 106, and the concentration of sand in the second mixture 106 is greater than a concentration of sand in the third mixture 116.

The diffuser 150 is positioned above a portion of the hopper 120 and above the shaker device 160. In aspects, the diffuser 150 does not separate and solids and liquids from one another; that is, the diffuser 150 is not a separator (e.g., the diffuser 150 is not a hydro cyclone or centrifuge). The diffuser 150 receives a flow of sand and liquid from the hopper 120, the recirculation chamber 130, or from both the hopper 120 and the recirculation chamber 130. The diffuser 150 spreads the volume of sand and liquid received therein across a diffusion surface (see FIGS. 5A and 5B for description) and then flows out of an outlet of the diffuser 150, where the outlet has a width that corresponds to or is compatible with a width of a screen of the shaker device 160. The sand and liquid mixture, referred to herein as the diffuser mixture 109, then pour onto the screen(s) of the shaker device 160.

The shaker device 160 can be any sand shaker known in the art with the aid of this disclosure. In aspects, the shaker device 160 is a linear shaker. An example of a commercially available shaker device 160 is the Rhombus High Efficiency Shale Shaker manufactured by 7 Dynamics.

The shaker device 160 can include one or more screens. In some aspects, multiple screens can be configured in two layers, which one layer of screen(s) (e.g., a main deck) being positioned over a second layer of screen(s). Each screen in the shaker device 160 independently can be manufactured from stainless steel, a composite material, polyurethane, or a combination thereof. In some aspects, the screens of the shaker device 160 can have a length in a range of 1.0 m to 1.5 m, a width in a range of from 0.5 m to 1.0 m, and a height of 0.05 to 0.15 m. The screen(s) can have a mesh size suitable for the sand particle size used for fracturing the subterranean formation (i.e., the sand that is part of the fluid produced in the well stream 1). Mesh size relates to the number of openings per linear inch of the screen. In aspects, the mesh size of each screen independently can be in a range of 80 to 170 mesh (80 to 170 API; 177 micron to 88 micron); alternatively, 80, 100, 120, 140, or 170 mesh (80, 100, 120, 140, or 170 API; 177, 149, 125, 105, or 88 microns). In some aspects, the mesh size of each screen is 120 or 140 mesh (120 or 140 API; 125 or 105 microns). In some aspects, the shaker device 160 can hold multiple screens, and the multiple screen can have all the same mesh size, or a combination of mesh sizes.

At least a portion of the shaker device 160 is positioned above a portion of the hopper 120 such that shaker recycle liquid 111 that separates from the diffuser mixture 109 by flowing or otherwise passing through the screen(s) of the shaker device 160, falls or flows into the first mixture 103 contained in the hopper 120. The portion of the hopper 120 above which the shaker device 160 is positioned is different than the portion of the hopper 120 above which the sand removal feed 101 provides slurry 102 from the gas separator 30 into the first mixture 103 of the hopper 120.

Figure 4A:
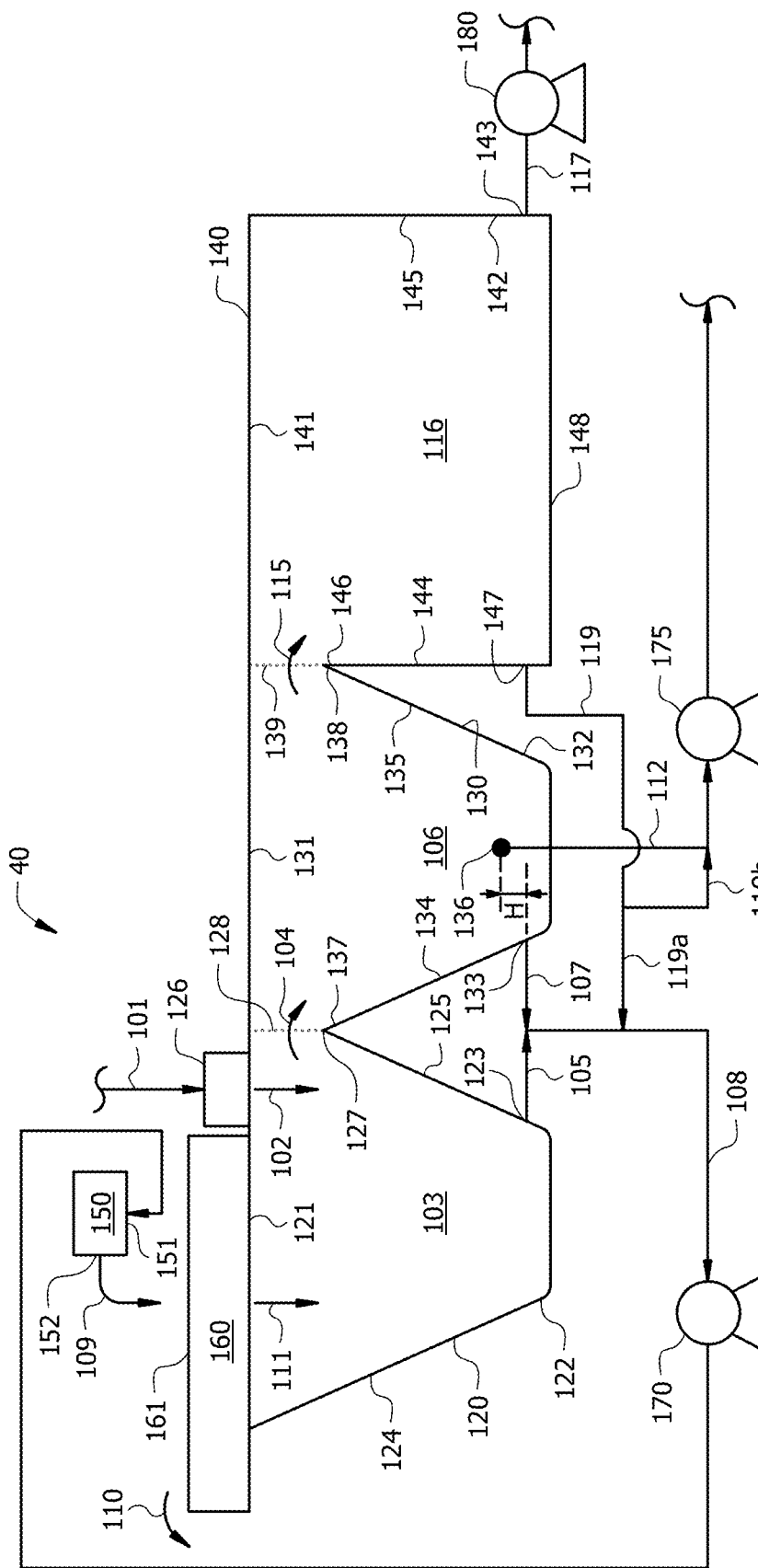
FIG. 4A illustrates a process flow diagram of an embodiment of the sand removal apparatus disclosed herein.

Fluids can be recirculated in the sand removal apparatus 40 using pumps, which are described in more detail in the description for FIG. 4A. The pumps and shaker device 160 can be electrically powered with electricity provided by grid electricity, battery electricity, electricity generated by a diesel-powered generator, or a combination thereof. It should be appreciated that sophisticated control devices may not be needed for operation of the system 100, since the flow of fluid in the recirculation loops drives separation and solids and liquid flow out of the sand removal apparatus 40, which may reduce and/or even eliminate risk of failure of or explosion due to operation of control devices.

In aspects, the sand removal apparatus 40 can have a footprint with dimensions of a length in a range of 40 ft to 55 ft (12.1 m to 16.8 m), a width in a range of 6 ft to 10 ft (1.8 m to 3.048 m), and a height in a range of 7 ft to 15 ft (2.1 m to 4.6 m). The footprint dimensions can be for embodiments of the sand removal apparatus 40 that includes the support structure of the sand removal apparatus 40 to which the components described herein are attached, and any transport equipment (e.g., wheels, axles, brakes, trailer hitching equipment) for transporting the sand removal apparatus 40 on roads without having to disassemble any of the components of the sand removal apparatus 40.

In operation of the system 100, flow in the streams and equipment illustrated in FIG. 1A and described herein is on a continuous basis, unless otherwise described. Well stream 1 flows to the plug catcher 10 to remove large solids such as plug pieces and rock fragments, forming stream 2 containing gas, liquid, and solids having a size that passes through the screen(s) of the plug catcher 10. Stream 2, containing gas, liquid, and solid (e.g., sand particles) flows from the plug catcher 10 to the choke manifold 20. Stream 3, containing gas, liquid, and solid (e.g., sand particles) as described above flows to the gas separator 30. The gas separator 30 separates stream 3 into gas product that flows in stream 4 and slurry (water and sand, sometimes hydrocarbon liquids and/or additive(s) described herein) that flows in slurry discharge line 5. Recirculation of fluid containing sand and water from the sand removal system 40 in stream 112 assists in removal of the slurry from the gas separator 30. For example, stream 112 splits into stream 113 and stream 114, where stream 113 is introduced into a side wall of the gas separator 30 to create rotation of the slurry in the gas separator 30 and where stream 114 passes perpendicularly relative to slurry discharge line 5 to create a Venturi effect which helps pull the slurry out of the gas separator 30 via slurry discharge line 5, forming the sand removal feed 101. The sand removal feed 101 flows to the hopper 120, where the slurry 102 of the sand removal feed 101 flows (e.g., falls or drops by gravity) into the first mixture 103 in the hopper 120. The discharge port 126 can optionally be included, through which the sand removal feed 101 passes to direct the slurry 102 into the hopper 120. A first portion of the first mixture 103 flows in stream 105 out of the bottom of the hopper 120. A second portion 104 of the first mixture 103 flows over one of the side walls of the hopper 120 and one of the side walls of the recirculation chamber 130, into the second mixture 106 contained in the recirculation chamber 130. A first portion of the second mixture 106 flows in stream 107 out of the bottom of the recirculation chamber 130. In some aspects, a second portion of the second mixture 106 flows out of the bottom of the recirculation chamber 130 in stream 112 (e.g., the stream that recycles to the gas separator 30). A third portion 115 of the second mixture 106 flows over another of the side walls of the recirculation chamber 130 and one of the side walls of the tank 140, into the third mixture 116 that is contained in the tank 140. A portion of the third mixture 116 in the tank 140 can be intermittently (e.g., depending on a liquid level in the tank 140) or continuously removed from the tank 140 via stream 117. Stream 117, containing mostly liquid, can flow to a fracturing fluid container or a pit, for example. The flow of stream 117 can be reversed to periodically flush accumulated sand from the tank 140, according to the technique described herein.

Stream 105 and stream 107 can flow to the diffuser 150. In aspects, stream 105 and stream 107 can combine to form a combined stream 108 that flows (or is pumped) to the diffuser 150. In some aspects, the flow rate of slurry in stream 105 is greater than the flow rate of slurry in stream 107. For example, a ratio of flow rate in stream 105 to flow rate in stream 107 can be greater than 1, 2, 3, 4, or 5. The slurry received from streams 105 and 107 (e.g., via combined stream 108) by the diffuser 150 can be diffused on a diffusion surface of the diffuser 150 so that the diffuser mixture 109 evenly spreads on the diffusion surface to flow through an outlet of the diffuser 150 and onto a screen of the shaker device 160. The shaker device 160 receives the diffuser mixture 109 and screen(s) of the shaker device 160 separate the diffuser mixture 109 into i) sand 110 that is shaken by the shaker device 160 laterally to a location that is not above the hopper 120 and ii) a shaker recycle liquid 111 that flows (e.g., passes or falls) through the screen(s) of the shaker device 160 back into the first mixture 103 in the hopper 120. In aspects, the shaker recycle liquid 111 can contain sand solid particles that are smaller than the size of openings in the screen(s) of the shaker device 160.

Figure 1B:
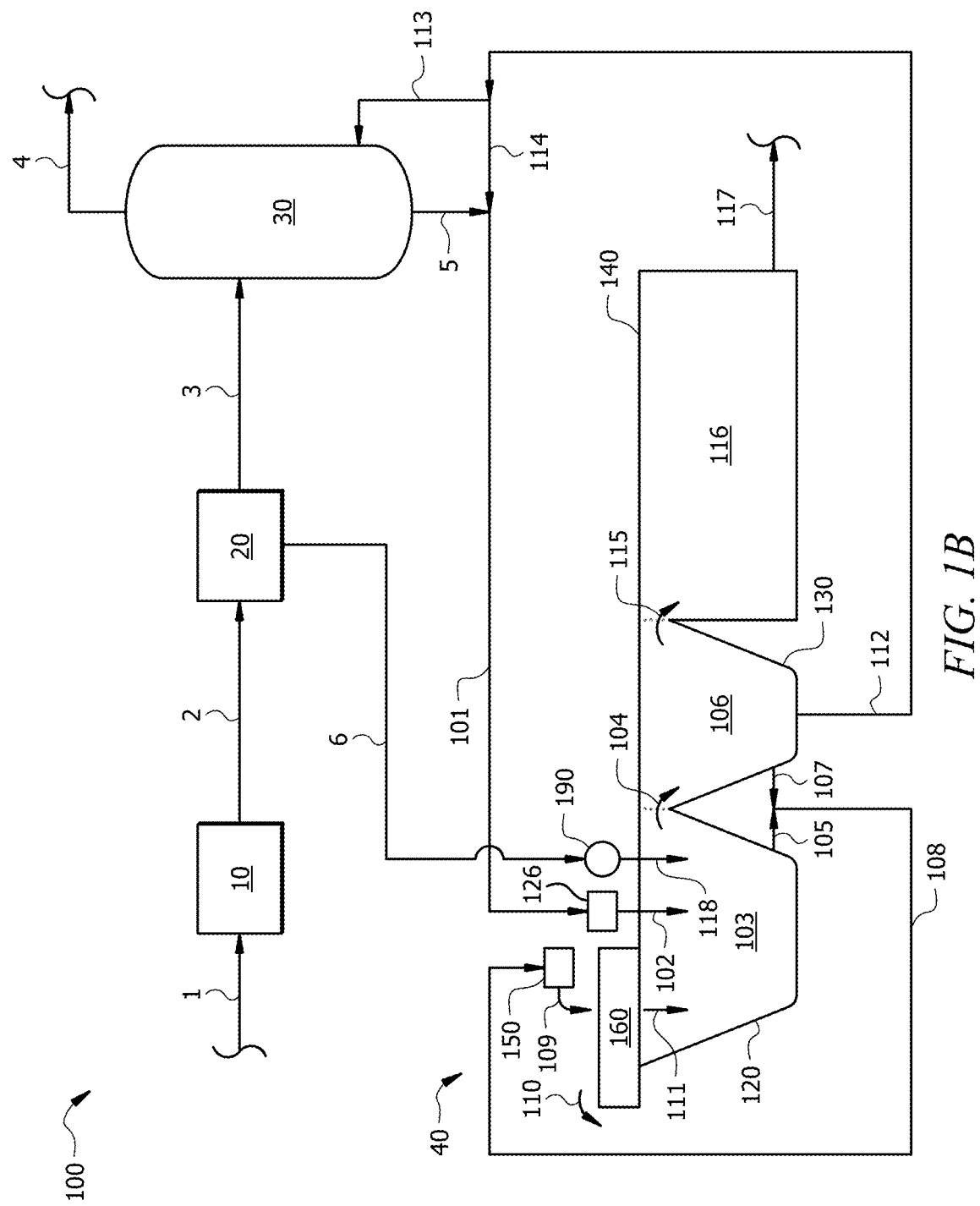
FIG. 1B illustrates another process flow diagram of a system having continuous recirculation for separation of fluids produced during drill out and flow back.

FIG. 1B illustrates another process flow diagram of a system 100 having continuous recirculation for separation of fluids produced during drill out and flow back. The components of systems 100 in FIG. 1B are the same as described for the system 100 in FIG. 1A, and such description is not reproduced again. The system 100 in FIG. 1B differs from the system 100 in FIG. 1A by inclusion of a bypass vessel 190 that is fluidly connected to the choke manifold 20. Process flow in FIG. 1B can occur when the gas separator 30 is offline. The gas separator 30 can be converted from an operational state to an offline state. When gas separator 30 is in an offline state, flow in stream 3 to the gas separator 30 is stopped or discontinued by actuating the choke manifold 20 to direct flow of fluid from stream 3 to bypass stream 6. Bypass stream 6 has the same composition as described for stream 3. Bypass stream 6 fluidly connects to the choke manifold 20 and to the sand removal apparatus 40. More particularly, bypass stream 6 fluidly connects to the choke manifold 20 and to a bypass vessel 190 of the sand removal apparatus 40.

The sand removal apparatus 40 in FIG. 1B can, in addition to the equipment described for FIG. 1A, include the bypass vessel 190. The bypass vessel 190 is configured to receive the contents of the bypass stream 6 while the flow in stream 3 to the gas separator 30 is stopped, e.g., while the gas separator 30 is in an offline state. The bypass vessel 190 redirects the liquid and sand slurry 118 of the bypass stream 6 downwardly out of the bypass vessel 190 and into the hopper 120. Gases contained in bypass stream 6 separate from the slurry 118 and flow out of the bypass vessel 190. An embodiment of the bypass vessel 190 is illustrated in FIGS. 6A to 6E and described in more detail herein.

While components from bypass stream 6 flow directly to the sand removal apparatus 40 in the system 100 in FIG. 1B, the sand removal apparatus 40 can operate with continuous recirculation as described herein. For example, the first portion of the first mixture 103 and the first portion of the second mixture 106 can continuously be withdrawn in streams 105 and 107, respectively, and sent to the diffuser 150 via stream 108, where the combined mixture is diffused into diffuser mixture 109 that falls onto the shaker device 160 which separates sand 110 from the shaker recycle liquid 111 that flows back into the first mixture 103 of the hopper 120. The second portion of the second mixture 106 can be continuously withdrawn in recycle stream 112 from the recirculation chamber 130, split into streams 113 and 114, combined from stream 114 and discharge line 5 to form sand removal feed 101, which flows slurry 102 back into the first mixture 103 contained in the hopper 120.

In some aspects of the offline state, the gas separator 30 can be fluidly isolated from the sand removal apparatus 40 by closing valves in gas product stream 4, stream 113, and slurry discharge line 5. In such scenarios, the second portion of the second mixture 106 in recycle stream 112 flows through stream 114 and then into the sand removal feed 101, without having any portion that flows into the gas separator 30 via stream 113. In other aspects of the offline state, the gas separator 30 can be partially fluidly isolated from the sand removal apparatus 40 by closing valves in gas product stream 4 and stream 113, while maintaining flow in stream 114 and discharge line 5 that can maintain Venturi effect in discharge line 5 to keep discharge line 5 from becoming clogged with residual solids.

Figure 2:
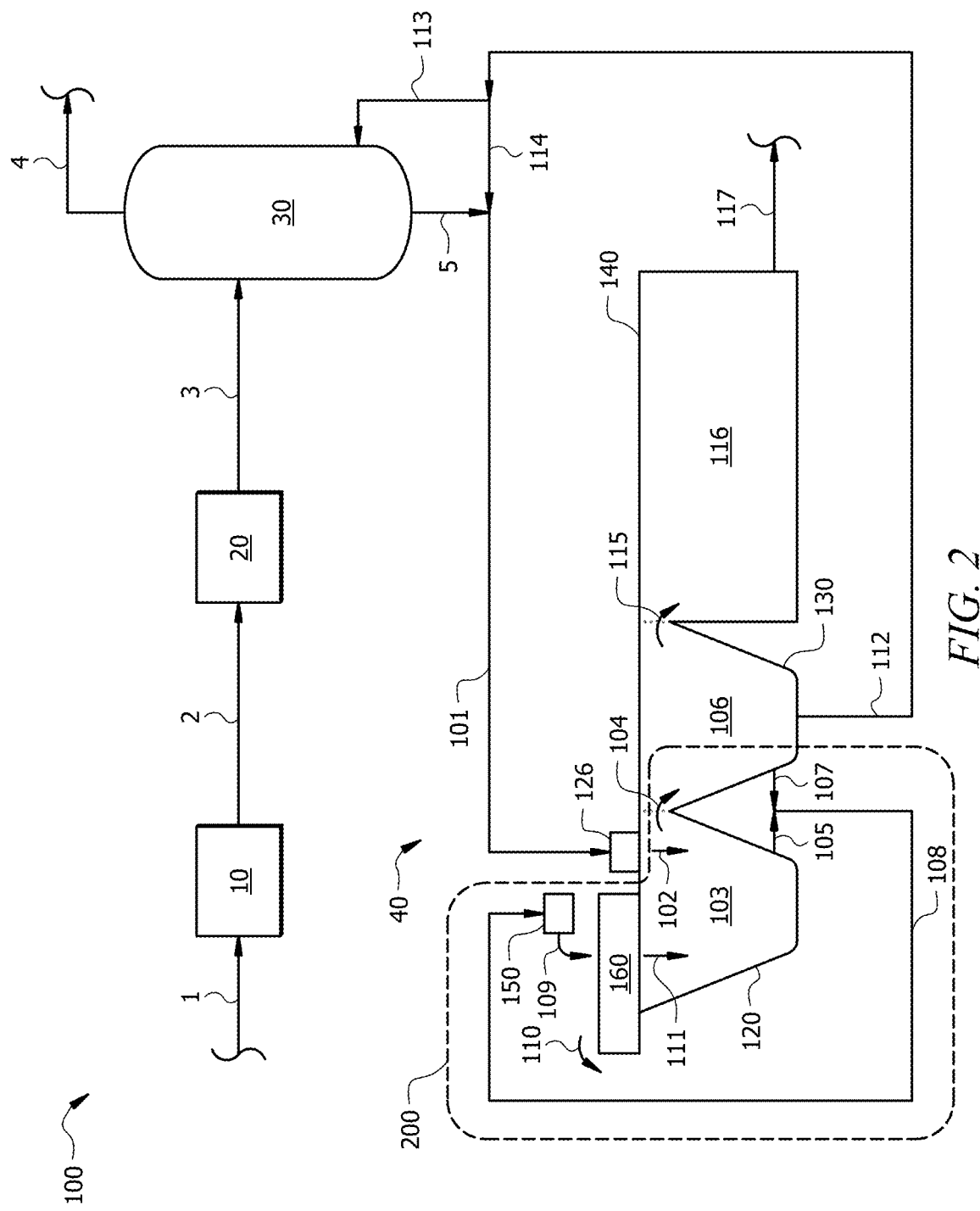
FIG. 2 illustrates the process flow diagram of the system in FIG. 1A, having dashed lines drawn to describe one of the continuous recirculation loops in the system.
Figure 3:
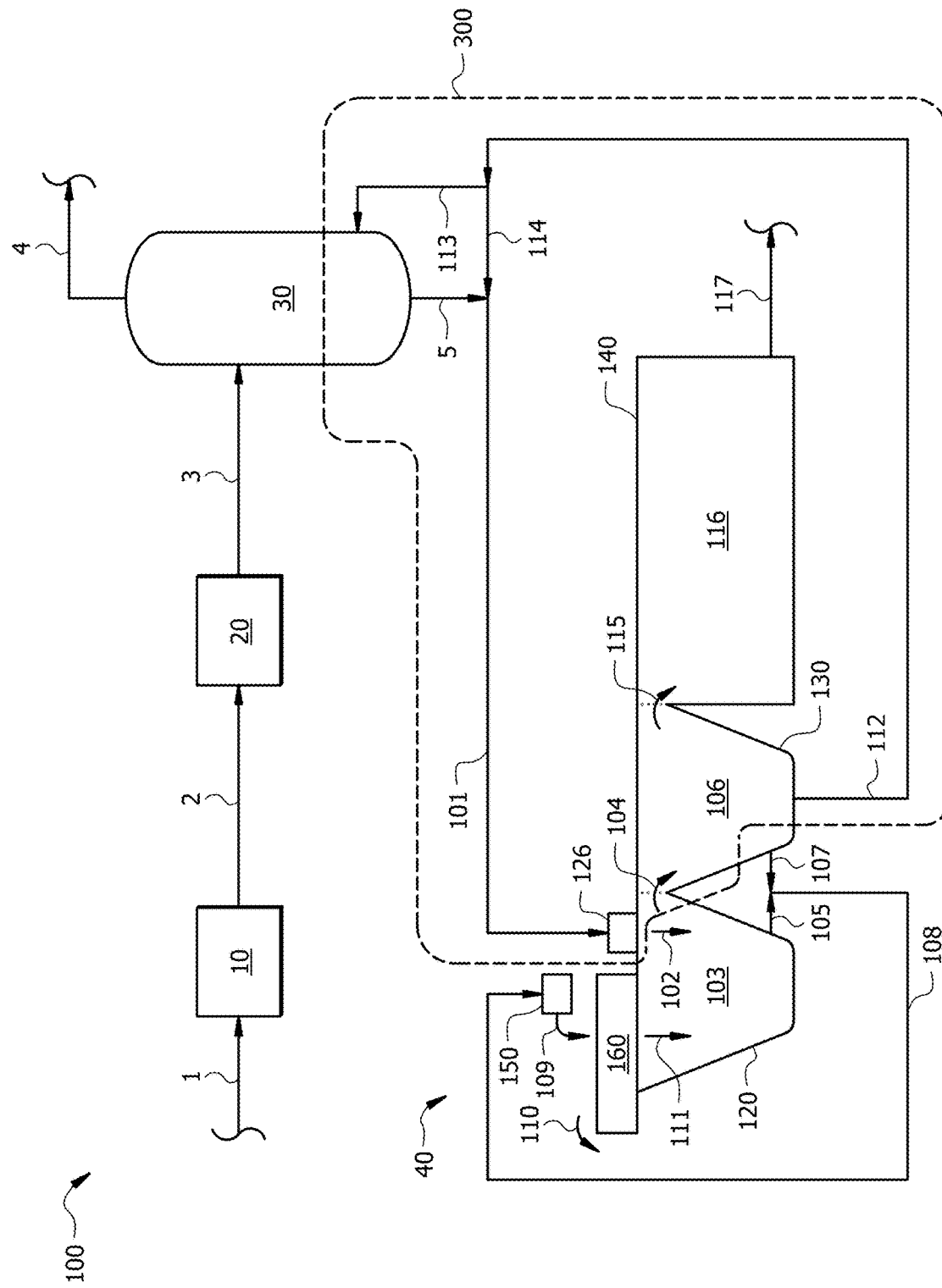
FIG. 3 illustrates the process flow diagram of the system in FIG. 1A, having dashed lines drawn to describe another of the continuous recirculation loops in the system.

Further examples of continuous recirculation in the sand removal apparatus 40 that can occur when the gas separator 30 is in the offline state are described as the continuous recirculation loops 200 and/or 300 in FIG. 2 and FIG. 3.

In FIG. 1B, because flow in stream 3 is stopped, the mass in recycle stream 112 equals the sum of the masses in streams 113 and 114, the mass in slurry discharge line 5 equals the mass in stream 113, and the mass in sand removal feed 101 equals the sum of the mass in stream 114 and the mass in discharge line 5. Alternatively, the mass in recycle stream 112 equals the mass in stream 114, and the mass in sand removal feed 101 equals the mass in stream 114. Also in FIG. 1B, because flow in stream 3 is stopped, there is no flow of gas in gas product stream 4.

The gas separator 30 can be converted from the offline state to the operational state by actuating valves in one or more of streams 3, 4, 5, and 114 to the open position so as to fluidly connect the gas separator 30 with the choke manifold 20 and the sand removal apparatus 40. Additionally, flow in bypass stream 6 to the sand removal apparatus 40 is stopped or discontinued by actuating the choke manifold 20 to direct flow of fluid from bypass stream 6 to stream 3. Flow of slurry to the bypass vessel 190 stops. The bypass vessel 190 can remain on the sand removal apparatus 40 for later utilization (e.g., maintenance of gas separator 30 or emergency). Operation of the system 100 as described for FIG. 1A can then continue, for example, with one or both of the continuous recirculation loops 200 and/or 300 of FIGS. 2 and 3 as described herein.

FIG. 2 illustrates the process flow diagram of the system 100 in FIG. 1A, having dashed lines drawn to describe a continuous recirculation loop 200 in the system 100. The process flow in the continuous recirculation loop 200 is continuous.

The continuous recirculation loop 200 is described having a combination of fluid paths for fluid in the sand removal apparatus 40. The number of fluid paths described herein is exemplary only to describe the flow path for fluids in the continuous recirculation loop 200.

In the continuous recirculation loop 200, a first fluid path is formed between the hopper 120 and the recirculation chamber 130, a second fluid path is formed between the hopper 120 and the diffuser 150, a third fluid path is formed between the recirculation chamber 130 and the diffuser 150, a fourth fluid path is formed between the diffuser 150 and the shaker device 160, and a fifth fluid path is formed between the shaker device 160 and the hopper 120.

In the first fluid path of the continuous recirculation loop 200, the second portion 104 of the first mixture 103 flows over one of the side walls of the hopper 120 and one of the side walls of the recirculation chamber 130, into the second mixture 106 in the recirculation chamber 130.

In the second fluid path of the continuous recirculation loop 200, the first portion of the first mixture 103 is withdrawn from a bottom of the hopper 120 into stream 105. Stream 105 can fluidly connect to the diffuser 150; alternatively, as illustrated in FIG. 2, stream 105 can combine with stream 107 to form stream 108 that is part of the third fluid path, where stream 108 fluidly connects with the diffuser 150.

In the third fluid path of the continuous recirculation loop 200, the first portion of the second mixture 106 is withdrawn from a bottom of the recirculation chamber 130 into stream 107. Stream 107 can fluidly connect to the diffuser 150; alternatively, as illustrated in FIG. 2, stream 107 can combine with stream 105 to form stream 108 that is part of the second fluid path, where stream 108 fluidly connects with the diffuser 150. In aspects where the recirculation chamber 130 comprises a plurality of recirculation chambers connected side-to-side in series, where the first of the series receives the portion 104 of first mixture 103 and the last in the series flow the portion 115 of the second mixture 106 to the tank 140, the continuous recirculation loop 200 can include the first portion of the second mixture 106 withdrawn from a bottom of the recirculation chamber that is the first in the series of recirculation chambers; alternatively, the continuous recirculation loop 200 can include a portion of the second mixture 106 (collectively all the recirculation chambers can be described as containing the second mixture 106) from a bottom of each of the recirculation chambers 130 and combine the withdrawn portions into stream 107.

In the fourth fluid path of the continuous recirculation loop 200, the diffuser mixture 109 flows through the diffuser 150 and through an outlet of the diffuser 150 (the outlet is described in FIGS. 4, 5A, and 5B) to a screen(s) of the shaker device 160.

In the fifth fluid path of the continuous recirculation loop 200, the shaker recycle liquid 111 that is separated from diffuser mixture 109 by the screen(s) of the shaker device 160 passes or flows through the screen(s) downward to the first mixture 103 in the hopper 120.

Fluids can simultaneously and continuously flow in the continuous recirculation loop 200. In some aspects, the continuous recirculation loop 200 does not include the second fluid path. That is, in some aspects, no portion of the second mixture 106 is withdrawn from the recirculation chamber 130 as part of the continuous recirculation loop 200. In other aspects, the continuous recirculation loop 200 includes the second fluid path as described herein.

It has been found that operating the sand removal apparatus 40 with the continuous recirculation loop 200 more efficiently and effectively separates sand from liquids and produces sand 110 that is drier than sand produced with sand removal techniques that do not have the continuous recirculation loop 200 described herein, e.g., apparatus that have an auger that removes sand from the hopper 120 (or a bin that catches sand below the hopper 120; or apparatus that does not have a diffuser 150 in the continuous recirculation loop 200).

FIG. 3 illustrates the process flow diagram of the system 100 in FIG. 1A, having dashed lines drawn to describe another continuous recirculation loop 300 in the system 100. The process flow in the continuous recirculation loop 300 is continuous. In aspects, the continuous recirculation loop 300 is used in combination with the continuous recirculation loop 200 and fluids simultaneously recirculate through both the continuous recirculation loop 200 and the continuous recirculation loop 300.

The continuous recirculation loop 300 is described having a combination of fluid paths for fluid in the sand removal apparatus 40 and fluid between the gas separator 30 and the sand removal apparatus 40. For example, the continuous recirculation loop 300 can have a first fluid path, a second fluid path, and a third fluid path. The number of fluid paths described herein is exemplary only to describe the flow path for fluids in the continuous recirculation loop 300.

In the continuous recirculation loop 300, a first fluid path is formed between the hopper 120 and the recirculation chamber 130, a second fluid path is formed between the recirculation chamber 130 and the gas separator 30, a third fluid path is formed between the gas separator 30 and the hopper 120.

When the continuous recirculation loop 300 is utilized in combination with the continuous recirculation loop 200, the first fluid path of the continuous recirculation loop 300 is the same as the first fluid path of the continuous recirculation loop 200, the second fluid path of the continuous recirculation loop 300 can be referred to as the sixth fluid path, and the third fluid path of the continuous recirculation loop 300 can be referred to as the seventh fluid path.

The first fluid path described for the continuous recirculation loop 300 is the same as the first fluid path described for the continuous recirculation loop 200. In the first fluid path of the continuous recirculation loop 300, the second portion 104 of the first mixture 103 flows over one of the side walls of the hopper 120 and one of the side walls of the recirculation chamber 130, into the second mixture 106 in the recirculation chamber 130.

In the second fluid path for the continuous recirculation loop 300, a second portion of the second mixture 106 is withdrawn from the bottom of the recirculation chamber 130 into recycle stream 112. Recycle stream 112 is connected to the bottom of the recirculation chamber 130, to stream 113, and to stream 114. The second portion of the second mixture 106 flows in stream 112 from the recirculation chamber 130 until the recycle stream splits the second portion of the second mixture 106 into a first portion of the second portion of the second mixture 106 and a second portion of the second portion of the second mixture 106. The split can be an equal flow split into stream 113 and stream 114, for example. The flow of portion in stream 113 and through the bottom of the gas separator 30 into the slurry discharge line 5 is part of the second fluid path of the continuous recirculation loop 300. That portion combines with the portion in stream 114, along with slurry removed from the gas separator 30 that is recovered from stream 3, forming the sand removal feed 101.

In the third fluid path for the continuous recirculation loop 300, the slurry in the sand removal feed 101 flows to a location above the hopper 120, where the slurry is discharged out of the sand removal feed 101, optionally passing through discharge port 126, and into the first mixture 103 contained in the hopper 120.

Fluids can simultaneously and continuously flow in the continuous recirculation loop 300.

In aspects where the recirculation chamber 130 comprises a plurality of recirculation chambers connected side-to-side in series, where the first of the series receives the portion 104 of first mixture 103 and the last in the series flow the portion 115 of the second mixture 106 to the tank 140, the continuous recirculation loop 300 can withdraw a portion of the second mixture 106 (collectively all the recirculation chambers can be described as containing the second mixture 106) from a bottom of each of the recirculation chambers 130 and combine the withdrawn portions into stream 112. An example of a continuous recirculation loop 300 with multiple recirculation chambers 130 in series, where a portion is withdrawn from each recirculation chamber and recycled to a gas separator is described in U.S. Pat. No. 11,492,859, which is incorporated by reference in its entirety.

FIG. 4A illustrates a process flow diagram of the sand removal apparatus 40 of FIGS. 1 to 3, that separates sand from liquids and contains continuous recirculation loop 200 and continuous recirculation loop 300.

The top 121 of the hopper 120 is open to the atmosphere and can function as the inlet of the hopper 120 that receives the slurry 102 from the sand removal feed 101 that is positioned above a first portion of the top 121 of the hopper 120 and that receives the shaker recycle liquid 111 from the shaker device 160 that is at least partially positioned over a second portion of the top 121 of the hopper 120.

In aspects where the discharge port 126 is present in the sand removal apparatus 40, the discharge port 126 can be positioned over the first portion of the top 121 of the hopper 120 so that contents of the sand removal feed 101 pass through the discharge port 126, forming the slurry 102 that falls into the first mixture 103 in the hopper 120. The discharge port 126 can be embodied as a box-like structure that has an open bottom, where the top and sides of the box-like structure stop any splashed portions of the sand removal feed 101 and redirect the splashed portions vertically downwardly into the first mixture 103 in the hopper 120 as a slurry 102.

Two of the side walls 124 and 125 of the hopper 120 are shown extending at an angle with respect to vertical. An example of the angled orientation of side walls 124 and 125 are angles in a range of 15° to 45°, for example, about 36°, with respect to vertical. The two side walls that connect to each of side walls 124 and 125 can be vertically oriented; alternatively, the two side walls that connect to each of side walls 124 and 125 also extend at an angle in a range of 15° to 45° with respect to vertical. Side wall 124 and the two side walls that connect to each of side walls 124 and 125 have a height such that none of the first mixture 103 can flow over these walls. Side wall 125, on the other hand, has a height such that portion 104 of the first mixture 103, when the level of the first mixture 103 is greater than the height of the side wall 125, can flow over the top 127 of the side wall 125. The dashed line 128 represents the open space (forming a waterfall-type outlet) between the top 127 of side wall 125 and the top 121 of the hopper 120 through which the portion 104 of the first mixture 103 can flow from the hopper 120 into the recirculation chamber 130.

Stream 105 is connected to the outlet 123 of the hopper 120. The outlet 123 is located on the bottom portion 122 of the hopper 120. In FIG. 4A, the outlet 123 is on side wall 125; although, in other embodiments, the outlet 123 can be located on any of the side walls of the hopper 120 or on a bottom surface of the hopper 120. In aspects, outlet 123 is the only outlet on the bottom portion 122 of the hopper 120. In aspects, the outlet 123 can be embodied as a hole or pipe connected to a hole in the bottom portion 122 of the hopper 120.

The bottom surface of the hopper 120 can be a point where all the side walls (including side walls 124 and 125) of the hopper 120 meet, an edge where the two of the side walls 124 and 125 meet, or a flat or rounded surface that is connected to each of the side walls of the hopper 120. In aspects where the bottom surface of the hopper 120 is an edge, a flat surface, or a rounded surface, the largest dimension (e.g., a diameter, length, or width) of the edge, the flat surface, or the rounded surface can be in a range of 6 inches to 24 inches (15.24 cm to 60.96 cm).

The top 131 of the recirculation chamber 130 can be open to the atmosphere; alternatively, the top 131 can be a flat surface such as a sheet of metal that is connected or placed next to a top of at least one side wall of the recirculation chamber 130.

Two of the side walls 134 and 135 of the recirculation chamber 130 are shown extending at an angle with respect to vertical. An example of the angled orientation of side walls 134 and 135 are angles in a range of 15° to 45°, for example, about 36°, with respect to vertical. The two side walls that connect to each of side walls 134 and 135 can be vertically oriented; alternatively, the two side walls that connect to each of side walls 134 and 135 also extend at an angle in a range of 15° to 45° with respect to vertical. The two side walls that connect to each of side walls 134 and 135 have a height such that none of the second mixture 106 can flow over these walls. Side wall 134, on the other hand, has a height such that portion 104 of the first mixture 103, when the level of the first mixture 103 is greater than the height of the side wall 134, can flow over the top 137 of the side wall 134. The dashed line 128 represents the open space (forming a waterfall-type outlet) between the top 137 of side wall 134 and the top 131 of the recirculation chamber 130 through which the portion 104 of the first mixture 103 can flow from the hopper 120 into the recirculation chamber 130. Similar to side wall 134, side wall 135 has a height such that portion 115 of the second mixture 106, when the level of the second mixture 106 is greater than the height of the side wall 135, can flow over the top 138 of the side wall 135. The dashed line 139 represents the open space (forming a waterfall-type outlet) between the top 138 of side wall 135 and the top 131 of the recirculation chamber 130 through which the portion 115 of the second mixture 106 can flow from the recirculation chamber 130 into the tank 140.

Stream 107 is connected to the first outlet 133 of the recirculation chamber 130. The first outlet 133 is located on the bottom portion 132 of the recirculation chamber 130. In FIG. 4A, the first outlet 133 is on side wall 134; although, in other embodiments, the first outlet 133 can be located on any of the side walls of the recirculation chamber 130 or on a bottom surface of the recirculation chamber 130. In aspects, the first outlet 133 can be embodied as a hole or pipe connected to a hole in the bottom portion 132 of the recirculation chamber 130.

Stream 112 is connected to the second outlet 136 of the recirculation chamber 130. The second outlet 136 is located on the bottom portion 132 of the recirculation chamber 130. In FIG. 4A, the second outlet 136 is on a side wall that connects to side walls 134 and 135; although, in other embodiments, the second outlet 136 can be located on any of the side walls of the recirculation chamber 130 or on a bottom surface of the recirculation chamber 130. In aspects, the second outlet 136 can be embodied as a hole or pipe connected to a hole in the bottom portion 132 of the recirculation chamber 130.

The bottom surface of the second outlet 136 can be a point where all the side walls (including side walls 134 and 135) of the second outlet 136 meet, an edge where the two of the side walls 134 and 135 meet, or a flat or rounded surface that is connected to each of the side walls of the second outlet 136. In aspects where the bottom surface of the second outlet 136 is an edge, a flat surface, or a rounded surface, the largest dimension (e.g., a diameter, length, or width) of the edge, the flat surface, or the rounded surface can be in a range of 6 inches to 24 inches (15.24 cm to 60.96 cm).

FIG. 4A illustrates that, in some aspects, the first outlet 133 of recirculation chamber 130 can be positioned at a height above ground that is less than a height above ground at which the second outlet 136 of recirculation chamber 130 is positioned. The difference in height between the first outlet 133 and the second outlet 136 is illustrated in FIG. 4A as H, which is greater than 0 in (0 cm) in these aspects. Positioning the first outlet 133 and the second outlet 136 such that H is greater than 0 in (0 cm) creates slightly different compositions for the portion of the second mixture 106 that flows through the first outlet 133 compared to the portion of the second mixture 106 that flows through the second outlet 136. For example, the portion of the second mixture 106 that flows through the first outlet 133 can have a higher concentration of sand than the portion of the second mixture 106 that flows through the second outlet 136. This orientation of outlets 133 and 136 can facilitate a preference for sand flow in the sand removal apparatus 40 from the recirculation chamber 130 to the diffuser 150 and shaker device 160 versus from the recirculation chamber 130 to the gas separator 30.

The top 141 of the tank 140 can be open to the atmosphere; alternatively, the top 141 can be a flat surface such as a sheet of metal that is connected or placed next to a top of at least one side wall of the tank 140. Side walls 144 and 145 of the tank 140 are shown extending vertically; however, it is contemplated that one or both side walls 144 and 145 can extend at an angle with respect to vertical in other embodiments. The two side walls that connect to each of side walls 144 and 145 can be vertically oriented; alternatively, the two side walls that connect to each of side walls 144 and 145 can extend at an angle with respect to vertical. Side wall 145 and the two side walls that connect to each of side walls 144 and 145 have a height such that none of the third mixture 116 can flow over these walls. Side wall 144, on the other hand, has a height such that portion 115 of the second mixture 106, when the level of the second mixture 106 is greater than the height of the side wall 144, can flow over the top 146 of the side wall 144. The dashed line 139 represents the open space (forming a waterfall-type inlet to the tank 140) between the top 146 of side wall 144 and the top 141 of the tank 140 through which the portion 115 of the second mixture 106 can flow from the recirculation chamber 130 to the tank 140.

Stream 117 is connected to the outlet 143 of the tank 140. The outlet 143 is located on the bottom portion 142 of the tank 140. In FIG. 4A, the outlet 143 is on side wall 145; although, in other embodiments, the outlet 143 can be located on any of the side walls of the tank 140 or on a bottom surface of the tank 140. In aspects, outlet 143 is the only outlet on the bottom portion 142 of the tank 140; alternatively, the tank 140 has a flush outlet 147 for flushing sand accumulated on the bottom of the tank 140 out of the tank 140. In aspects, the outlet 143 can be embodied as a hole or pipe connected to a hole in the bottom portion 142 of the tank 140.

The bottom surface 148 of the tank 140 is a flat surface that is connected to each of the side walls of the tank 140. The flat surface can have a rectangular shape, for example, having a length in a range of 10 ft to 20 ft (3.048 m to 6.096 m) and a width in a range of 5 ft to 10 ft (1.524 m to 3.048 m). In aspects, the bottom surface 148 can be inclined. For example, in aspects which have a flush outlet 147 for flushing sand out of the tank 140, the end of the bottom surface 148 that is proximate to the side wall 145 can be higher above the ground than the end of the bottom surface 148 that is proximate to the side wall 144. Alternatively, when removing any settled sand from the tank 140 via outlet 143, the end of the bottom surface 148 that is proximate to the side wall 144 can be higher above ground than the end of the bottom surface 148 that is proximate to the side wall 145.

The sand removal apparatus 40 can also include three pumps: first pump 170, second pump 175, and third pump 180. The three pumps can be included within the footprint of the sand removal apparatus 40 and attached to the support structure that facilitates transport of the sand removal apparatus 40 without a load permit.

The first pump 170 recirculates fluid (e.g., a portion of the first mixture 103 in the hopper 120, a portion of the second mixture 106 in the recirculation chamber 130, or both a portion of the first mixture 103 in the hopper 120 and a portion of the second mixture 106 in the recirculation chamber 130) in the continuous recirculation loop 200. First pump 170 can be a centrifugal pump, a positive displacement pump, a diaphragm pump, a peristaltic pump, or a progressive cavity pump, for example. In aspects, the pump 170 withdraws the portion of the first mixture 103 from the hopper 120 via stream 105, the portion of the second mixture 106 from the recirculation chamber 130 via stream 107, or both the portion of the first mixture 103 from the hopper 120 via stream 105 and the portion of the second mixture 106 from the recirculation chamber 130, with use of an auger to move the sand in the first mixture 103 and second mixture 106 to the outlets 123 and 133. In aspects, the first pump 170 is not a sand auger. In aspects, the pump 170 contains no component thereof that is a sand auger. In aspects, the first pump 170 pumps slurry in the continuous recirculation loop 200 (e.g., in stream 108) at a rate in a range of from 5 bbl/min to 12 bbl/min (0.795 $m^3$ to 1.908 $m^3$).

The second pump 175 recirculates a portion of the second mixture 106 in the recirculation chamber 130 in the continuous recirculation loop 300. Second pump 175 can be a centrifugal pump, a positive displacement pump, a diaphragm pump, a peristaltic pump, or a progressive cavity pump, for example. In aspects, the second pump 175 pumps slurry in the continuous recirculation loop 300 (e.g., in stream 112) at a rate in a range of from 5 bbl/min to 12 bbl/min (0.795 $m^3$ to 1.908 $m^3$).

The third pump 180 transfers a portion of the third mixture 116 out of the tank 140 of the sand removal apparatus 40 to a pit or fracturing fluid container. Third pump 180 can be a centrifugal pump, a positive displacement pump, a diaphragm pump, a peristaltic pump, or a progressive cavity pump, for example. In aspects, the third pump 180 pumps liquid in stream 117 at a rate in a range of from 5 bbl/min to 20 bbl/min (0.795 $m^3$ to 3.180 $m^3$). In aspects, the third pump 180 can be a two-way pump, in that, the pump 170 can be selectively controlled to pump fluid in a direction out of the tank 140 or in a direction into the tank 140.

Normal operation of sand removal apparatus 40 utilizes flow of fluid in a direction that is out of the tank 140 through stream 117, to achieve mass balance of fluids flowing into the sand removal apparatus 40 via sand removal feed 101 and out of the sand removal apparatus 40 via sand 110 and stream 117. In some aspects, sand can accumulate in the bottom portion 142 of the tank 140 such that a flush is needed to remove the accumulated sand. Aspects of this disclosure include a flush outlet 147 on the bottom portion 142 of the tank 140 (e.g., on side wall 144 in FIG. 4A; additionally or alternatively, on the bottom surface 148 of the tank 140) that is connected to a flush stream 119. Flush stream 119 can fluid connect to the continuous recirculation loop 200 via stream 119a, to continuous recirculation loop 300 via stream 119b, or to both continuous recirculation loop 200 via stream 119a and continuous recirculation loop 300 via stream 119b. When flush stream 119 fluidly connects to the continuous recirculation loop 200 via stream 119a, accumulated sand from the bottom portion 142 of the tank 140 flows to stream 108 in the continuous recirculation loop 200 and then to the shaker device 160 via the diffuser 150. When flush stream 119 fluidly connects to the continuous recirculation loop 300 via stream 119b, accumulated sand from the bottom portion 142 of the tank 140 flows to stream 112 in the continuous recirculation loop 300 for recycle to the sand removal apparatus 40 with the sand removal feed 101.

In flush operation, flow of a portion of the third mixture 116 in stream 117 by third pump 180 is stopped. A valve in stream 119 (which is closed in normal operation of the sand removal apparatus 40), a valve in stream 119a, a valve in stream 119b, or combinations thereof, can be opened, and the third pump 180 can be changed to flow fluid into the tank 140 at a flow rate that is sufficient to move accumulated sand toward flush outlet 147. The fluid source can be the pit or fracturing fluid container that the third mixture 116 is normally sent, for example. During flush operation, flow in the continuous recirculation loops 200 and 300 continues, and part of the suction provided by the first pump 170 can withdraw fluid containing the accumulated sand from the tank 140 via outlet 147 and into stream 119. In FIG. 4A, stream 119a connects to stream 108; however, stream 119 can alternatively connect to stream 105, stream 107, or a combination of streams 105, 107, and 108.

In aspects, the flow rate of first pump 170 can be the same as the flow rate of the second pump 175 (e.g., the flow rate of fluid in the continuous recirculation loop 200 is the same as the flow rate of fluid in the continuous recirculation loop 300).

Figure 4B:
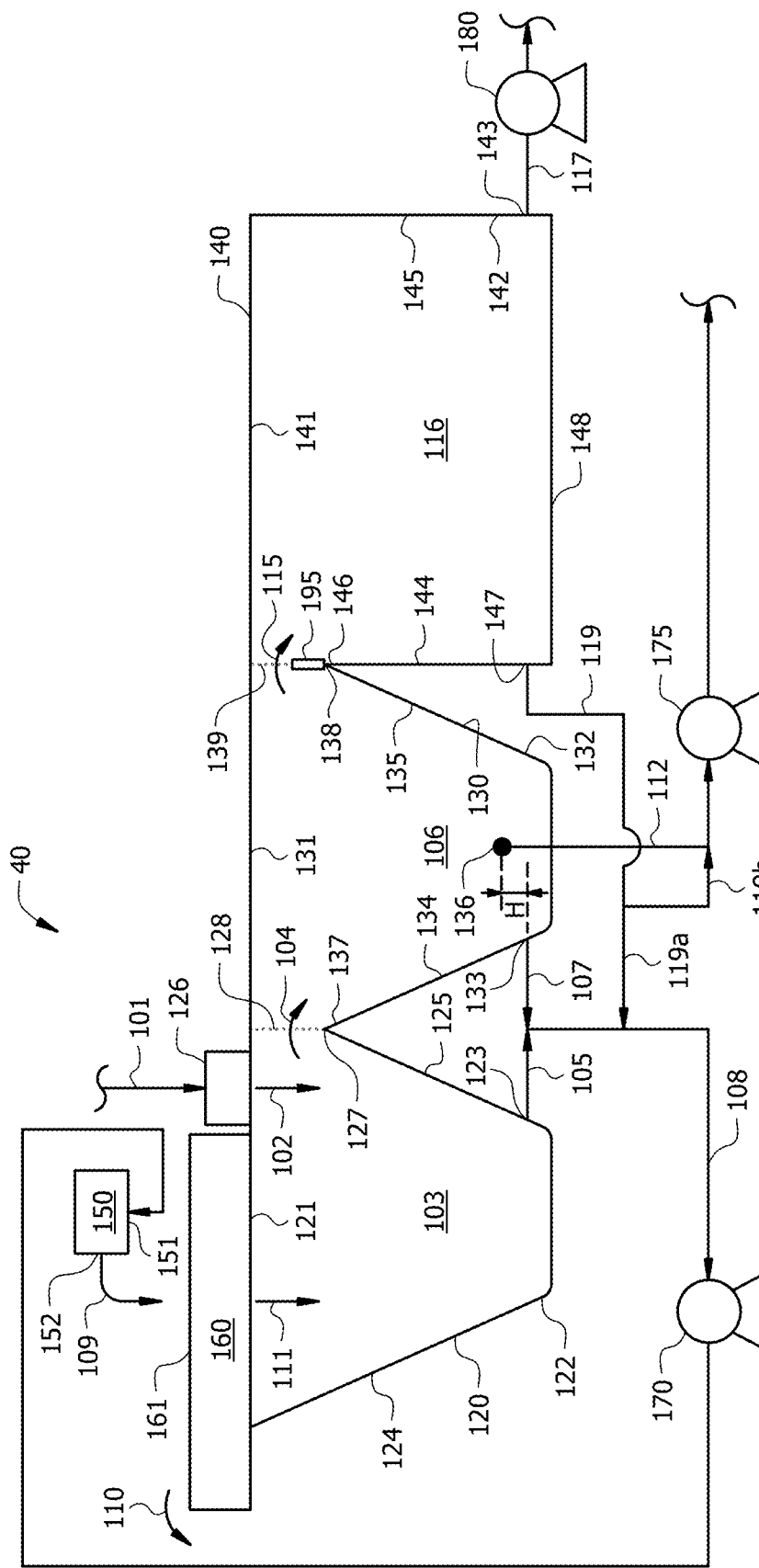
FIG. 4B illustrates a process flow diagram of another embodiment of the sand removal apparatus disclosed herein.

FIG. 4B illustrates a process flow diagram of another embodiment of the sand removal apparatus 40 disclosed herein. The sand removal apparatus 40 in FIG. 4B is the same as that described for FIG. 4A, except that in FIG. 4B, the sand removal apparatus 40 additionally includes a partition 195 between the recirculation chamber 130 and the tank 140. The partition 195 can be a sheet of metal with holes perforated therein. The portion 115 of the second mixture 106 in the recirculation chamber 130 can flow through the holes in the partition 195, effectively controlling the flow rate of the portion 115 into the tank 140. In scenarios where the level of the second mixture 106 increases above the top of the partition 195, the portion 115 of the second mixture 106 can flow through the holes in the partition 195 and over the top of the partition 195.

The partition 195 can contact or connect to a top 138 of side wall 135 of the recirculation chamber 130, to a top 146 of the side wall 144 of the tank 140, or to both such that portion 115 of the second mixture 106 passes over the top of the partition 195.

Figure 4C:
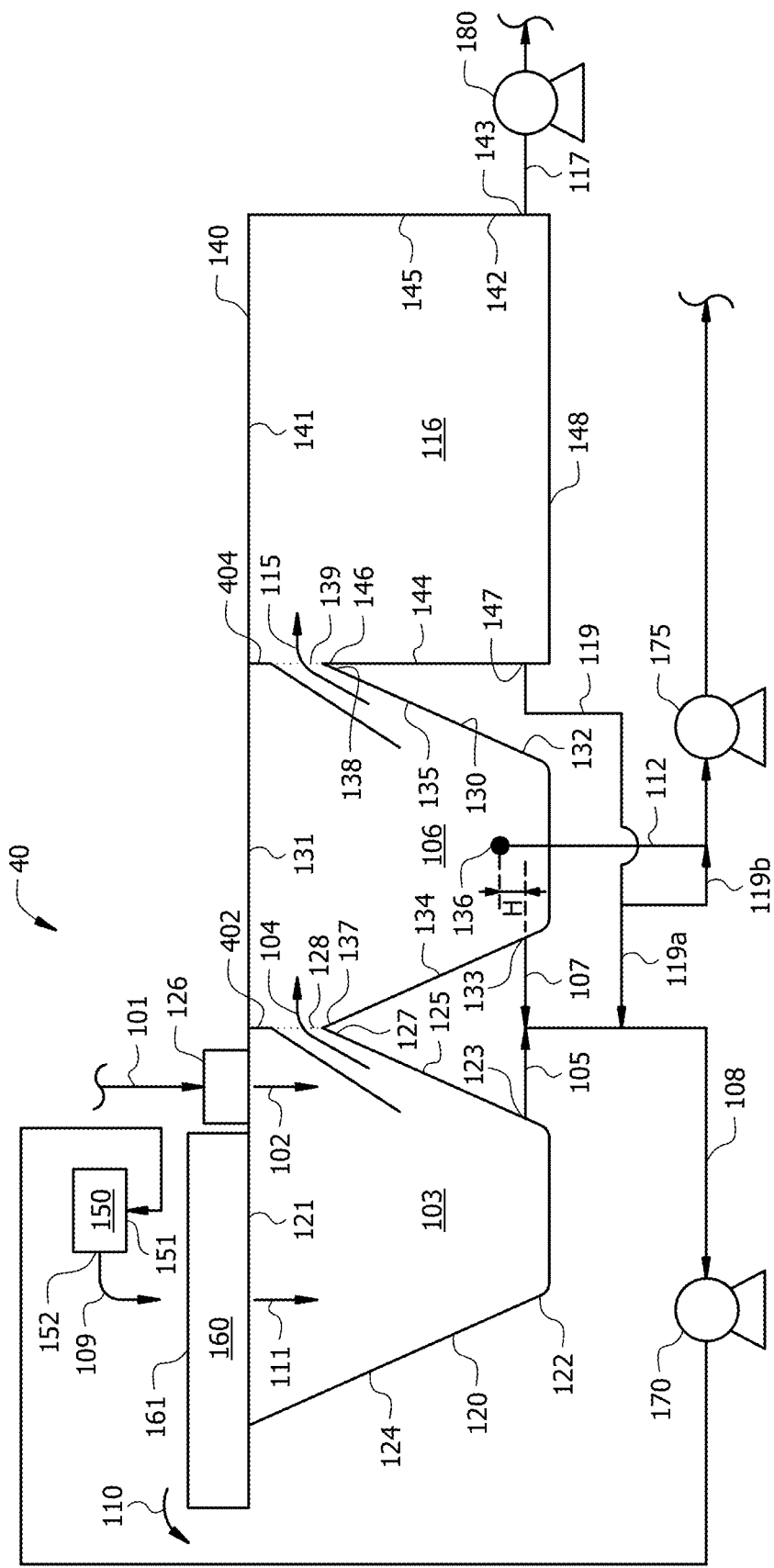
FIG. 4C illustrates a process flow diagram of another embodiment of the sand removal apparatus disclosed herein.

FIG. 4C illustrates a process flow diagram of another embodiment of the sand removal apparatus 40 disclosed herein. The sand removal apparatus 40 in FIG. 4C is the same as that described for FIG. 4A, except that in FIG. 4C, the sand removal apparatus 40 additionally includes weirs 402 and 404 in the hopper 120 and recirculation chamber 130.

Utilization of the weirs 402 and 404 in the sand removal apparatus 40 can facilitate separation of sand particles from liquid so that portion 104 of the first mixture 103 and portion 115 of the second mixture 106 have fewer sand particles than would otherwise be included in portions 104 and 115 without use of the weirs 402 and 404. For portion 104 of the first mixture 103 to flow from the hopper 120 into the recirculation chamber 130, the first mixture 103 flows downward toward the bottom portion 122 of the hopper 120 and then fluid flow changes direction in order for the portion 104 to flow between the weir 402 and side wall 125 of the hopper 120, to flow out through opening space represented by dashed line 128. For portion 115 of the second mixture 106 to flow from the recirculation chamber 130 into the tank 140, the second mixture 106 flows downward toward the bottom portion 132 of the recirculation chamber 130 and then fluid flow changes direction in order for the portion 115 to flow between the weir 404 and side wall 135 of the recirculation chamber 130, to flow out through opening space represented by dashed line 139.

Figure 4D:
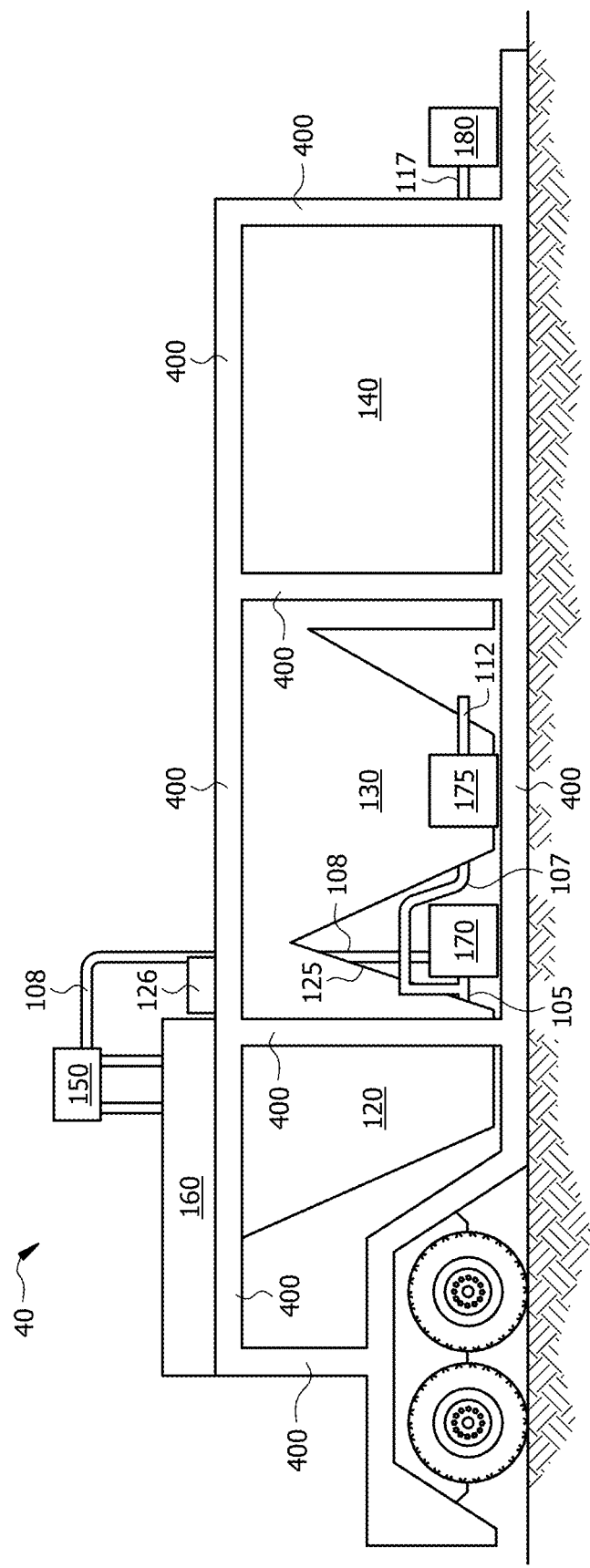
FIG. 4D illustrates a side elevational view of an embodiment of the sand removal apparatus disclosed herein.

FIG. 4D illustrates a side elevational view of an embodiment of the sand removal apparatus 40 disclosed herein. Particularly, a support structure 400 of the sand removal apparatus 40 is illustrated. The support structure 400, for example, can include any structural combination and arrangement tubular or solid metal beams that are arranged to support the hopper 120, recirculation chamber 130, tank 140, diffuser 150, shaker device 160, pump 170, pump 175, pump 180, or combinations thereof. The hopper 120, recirculation chamber 130, tank 140, diffuser 150, shaker device 160, pump 170, pump 175, pump 180, or combinations thereof can be connected directly to the support structure 400. In aspects, all of the equipment of the sand removal apparatus 40 is contained on the support structure 400. In some aspects, the support structure 40 can be integrated with transport equipment, e.g., axle, wheels, brakes, brake lights, etc., so that the entire sand removal apparatus 40 is a mobile apparatus. In other aspects, the support structure 400 can be arranged such that the sand removal apparatus 40 can be moved on and off a transport trailer as a single unit for transport of the sand removal apparatus 40 from one location to another.

In FIG. 4D, the piping of streams 105, 107, 108, 112, and 117 can be seen. Stream 108 receives the combined mixture from pump 170. Stream 108 includes piping that is connected to the outlet of pump 170 and to an inlet of the diffuser 150. Because of the arrangement of the diffuser 150 relative to the pump 170, the piping of stream 108 transports the mixture upward to the diffuser 150. As illustrated in FIG. 4D, the piping of stream 108 extends vertically upward through a side wall 125 of the hopper 120. The arrangement of piping in FIG. 4D is exemplary only and is not intended to limit the scope and arrangement of the piping and/or equipment of the sand removal apparatus 40 illustrated in FIG. 4D.

Figure 5A:
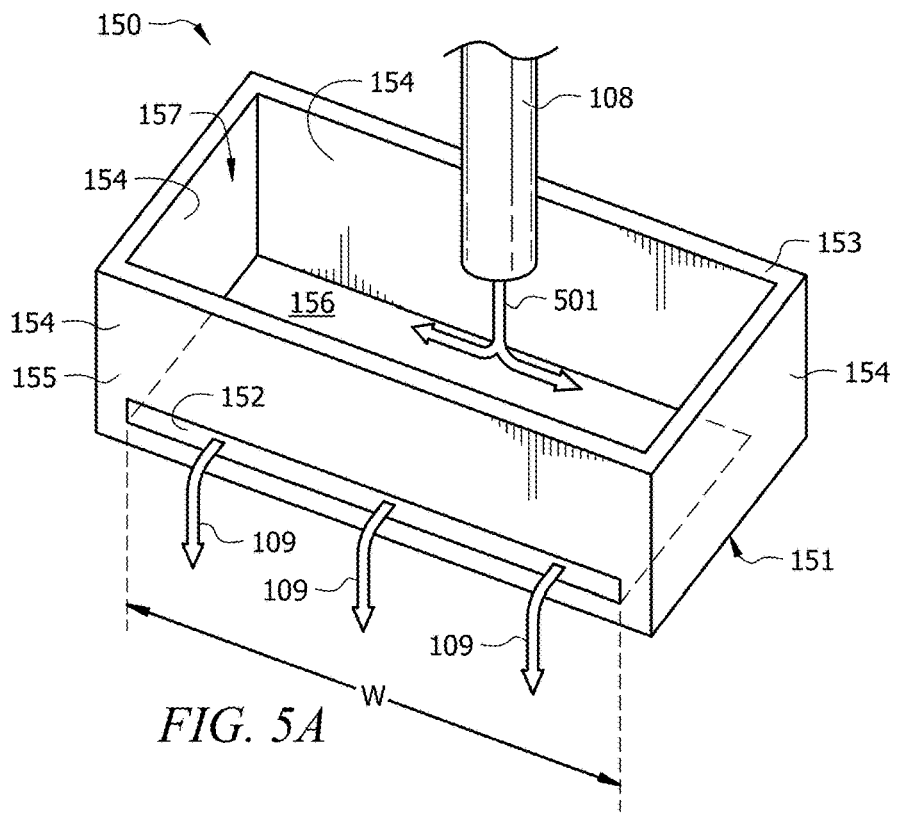
FIG. 5A illustrates a perspective view of an embodiment of the diffuser disclosed herein.
Figure 5B:
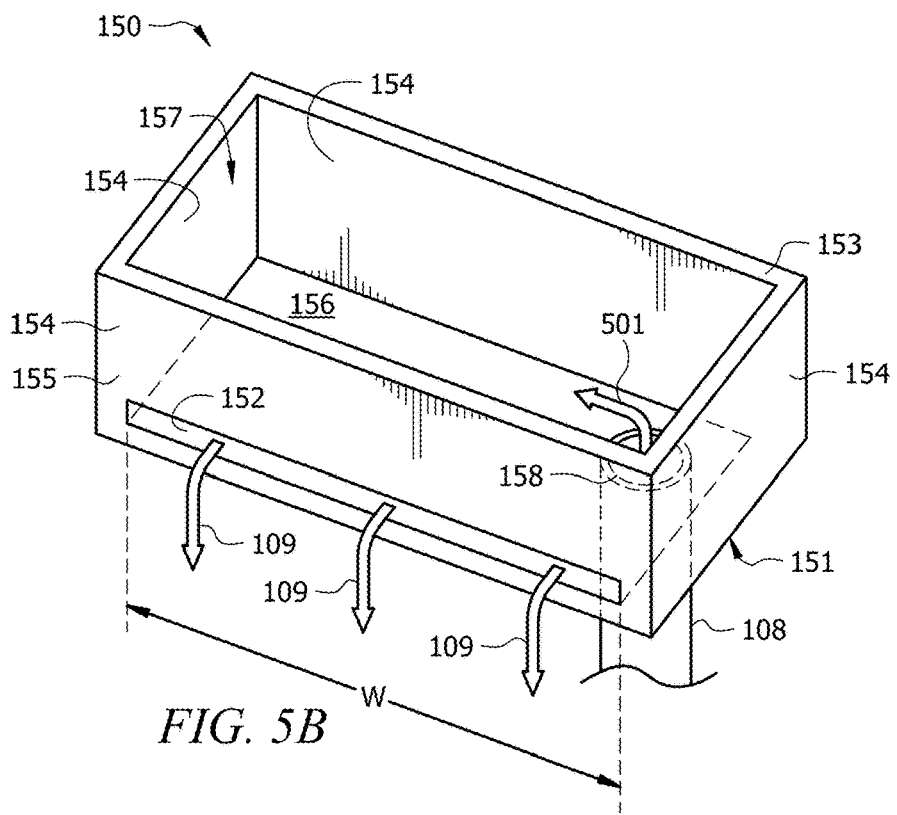
FIG. 5B illustrates a perspective view of another embodiment of the diffuser disclosed herein.

FIG. 5A illustrates a perspective view of an embodiment of the diffuser 150 disclosed herein, and FIG. 5B illustrates a perspective view of another embodiment of the diffuser 150 disclosed herein.

The diffuser 150 in FIGS. 5A and 5B is illustrated as having a rectangular box-like shape; although, it is contemplated that the diffuser 150 can have any shape or contour (e.g., rounded edges, rounded side walls, square box-like shape, etc.).

In aspects, the diffuser 150 is not a separator for the slurry 501 that is received from stream 108.

The diffuser 150 receives a flow of sand and liquid in stream 108 from the hopper 120, the recirculation chamber 130, or from both the hopper 120 and the recirculation chamber 130, for example, via stream 108 that is embodied as a pipe positioned over a top 153 of the diffuser 150 in FIG. 5A.

The top 153 of the diffuser 150 can be open to the atmosphere as illustrated in FIG. 5A; alternatively, the top 121 can be a piece of material such as metal that has a hole to connect to the pipe of stream 108.

The diffuser 150 has a bottom 151 and multiple side walls 154. For the configuration of diffuser 150 in FIGS. 5A and 5B, the diffuser has four side walls 154. The side wall 155 of side walls 154 that faces the shaker device 160 has an opening formed therein, which is the outlet 152 of the diffuser 150.

The diffuser 150 spreads the volume of sand and liquid slurry received therein across a diffusion surface 156. In FIGS. 5A and 5B, the diffusion surface 156 is the inside of the bottom 151 of the diffuser 150. The outlet 152 has a width W that is equal to, substantially equal to (within 1% smaller than), or less than 25% smaller than a width of a screen (or all the screens) of the shaker device 160. In aspects, the width W of the outlet 152 is not greater than the width of the screen(s) of the shaker device 160. Examples of width W of the outlet 152 can be in a range of from 0.5 m to 1.0 m. The sand and liquid mixture, referred to herein as the diffuser mixture 109, flow out of the outlet 152 of the diffuser 150 and onto the screen(s) of the shaker device 160. A height of the outlet 152 of the diffuser 150 can be 1 in to 6 inches (2.54 cm to 15.24 cm), for example.

In aspects, the diffusion surface 156 can be flat. In some aspects, the flat diffusion surface can be angled so that the slurry 501 is urged by gravity to the outlet 152. Flow of the slurry 501 into the diffuser 150 can facilitate mixing of the slurry 501 in the interior 157 of the diffuser 150 before portions thereof flow through the outlet 152 of the diffuser 150.

In FIG. 5A, the inlet of the diffuser 150 for the slurry 501 is the open top 121 of the diffuser 150, or a hole formed in a closed top 121 that connects to the pipe of stream 108. In contrast, the diffuser 150 of FIG. 5B receives the slurry 501 through an inlet hole 158 that is formed in the bottom 151 of the diffuser 150. The pipe of stream 108 can connect to the inlet hole 158, and slurry 501 can flow upwardly into the interior 157 of the diffuser. It has been found that locating the inlet of the diffuser 150 on the bottom 151 as an inlet hole 158 facilitates mixing of the slurry 501 in the interior 157 of the diffuser 150, better maintaining sand particles entrained in the liquid of the slurry 501 than the configuration of FIG. 5A.

Figure 6A:
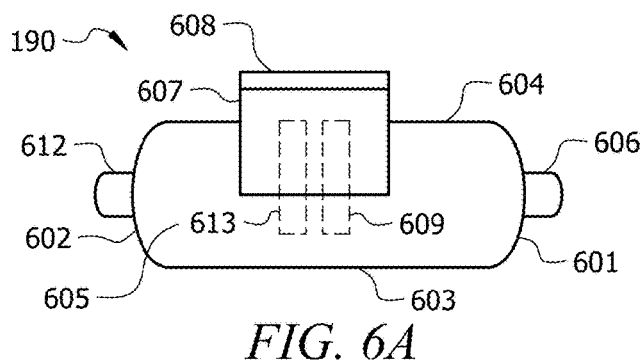
FIG. 6A illustrates a side elevational view of an embodiment of a bypass vessel.
Figure 6B:
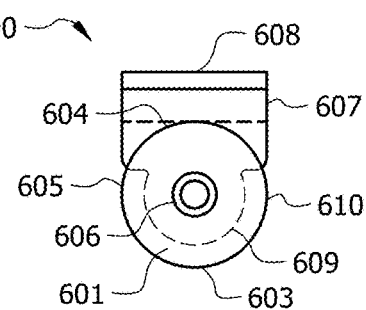
FIG. 6B illustrates an end view of the bypass vessel of FIG. 6A.
Figure 6C:
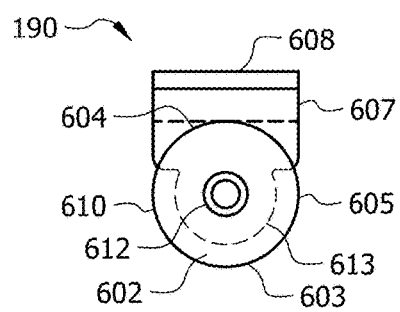
FIG. 6C illustrates an opposite end view of the bypass vessel of FIG. 6A.
Figure 6D:
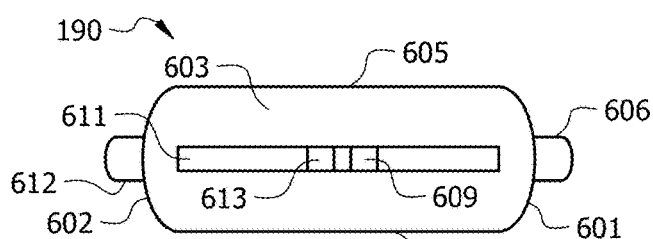
FIG. 6D illustrates a bottom view of the bypass vessel of FIG. 6A.

FIGS. 6A, 6B, 60, 6D, and 6E illustrate various views of an embodiment of the bypass vessel 190 that can be included in the sand removal apparatus 40 described herein. The elevational view of side 605 of the bypass vessel 190 in FIG. 6A is a mirror image of the elevational view of side 610 (which is not drawn). The bypass vessel 190 can generally have a cylindrical shape, rounded ends 601 and 602, and hollow interior. In some aspects, the bypass vessel 190 is oriented such that a longitudinal axis of the vessel extends horizontally.

The bypass vessel 190 can have an end 601, opposite end 602, bottom 603, top 604, side 605, and opposite side 610. An access port 607 can be attached to the top 604 of the bypass vessel 190, and the access port 607 can have a lid 608. The lid 608 can be attached for operation of the bypass vessel 190 and removed to access the inside of the bypass vessel 190. The bypass vessel 190 has a first inlet 606, which is illustrated as being attached to end 601 of the bypass vessel 190, and a second inlet 612, which is illustrated as being attached to the opposite end 602 of the bypass vessel 190. The first inlet 606, the second inlet 612, or both inlets 606 and 612 can be connected to bypass stream 6 illustrated in FIG. 1B. The bypass vessel 190 has an outlet 611, which is illustrated as being in a slot shape on the bottom 603 of the bypass vessel 190.

Figure 6E:
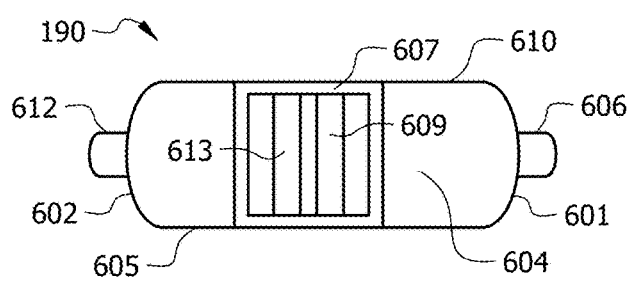
FIG. 6E illustrates a top view of the bypass vessel of FIG. 6A.

The bypass vessel 190 includes a first target plate 609 (for the first inlet 606) and a second target plate 613 (for the second inlet 612) placed in the hollow interior of the bypass vessel 190. The first target plate 609 and the second target plate 613 can each be a plate of metal that receives the flow of the mixture from bypass stream 6 on a contact surface of the target plate 609 and/or 613 and redirects the flow of the components of the mixture to the outlet 611 of the bypass vessel 190. The target plates 609 and 613 are illustrated with dashed lines in FIGS. 6A, 6B, and 6C. The target plates 609 and 613 can be formed with a portion that hangs from a shoulder of the access port 607. The components of the bypass stream 6 flow into the bypass vessel 190 via the first inlet 606, splashing against the first target plate 609. Additionally or alternatively, the components of the bypass stream 6 flow into the bypass vessel 190 via the second inlet 612, splashing against the second target plate 613. Splashed materials are contained in the bypass vessel 190 by the end 601, opposite end 602, bottom 603, top 604, side 605, and side 610 of the bypass vessel 190, so as to redirect the components out of the bypass vessel 190 via the outlet 611. Gas can separate from solids and liquids in the bypass vessel 190. All gases, solids, and liquids flow from the bypass vessel 190 via the outlet 611. The shape and dimensions of the bypass vessel 190 in FIGS. 6A, to 6E are exemplary, and are not intended to limit the shape and configuration of the bypass vessel 190.

ADDITIONAL DESCRIPTION

Aspect 1. A process comprising: receiving a sand removal feed comprising sand and water into a first mixture contained in a hopper; flowing a first portion of the first mixture from the hopper to a diffuser; flowing a second portion of the first mixture from the hopper into a second mixture comprising sand and water that is contained in a recirculation chamber; flowing a first portion of the second mixture from the recirculation chamber to the diffuser; flowing a second portion of the second mixture to a gas separator; flowing a diffuser mixture comprising the first portion of the first mixture and the first portion of the second mixture from the diffuser to a shaker device; and flowing a shaker recycle liquid from the shaker device to the hopper.

Aspect 2. The process of Aspect 1, further comprising: flowing a third portion of the second mixture to a third mixture in a tank; and flowing a portion of the third mixture from the tank to a pit or to a fracturing fluid container.

Aspect 3. The process of Aspect 1 or 2, wherein the hopper, the recirculation chamber, the diffuser, and the shaker device are connected to a mobile structure.

Aspect 4. The process of any one of Aspects 1 to 3, wherein flowing the first portion of the first mixture from the hopper to the diffuser and flowing the first portion of the second mixture from the recirculation chamber to the diffuser comprises: combining the first portion of the first mixture and the first portion of the second mixture to form a combined mixture; and pumping the combined mixture to the diffuser.

Aspect 5. The process of any one of Aspects 1 to 4, wherein the diffuser is located at least partially above the shaker device, wherein the shaker device is located at least partially above the hopper.

Aspect 6. The process of any one of Aspects 1 to 5, further comprising: shaking sand away from the shaker device to a location that is not above the hopper.

Aspect 7A. The process of any one of Aspects 1 to 6, wherein the sand removal feed is continuously received from the gas separator.

Aspect 7B. The process of any one of Aspects 1 to 7A, further comprising: flowing a recycle stream from the recirculation chamber to the gas separator, wherein the sand removal feed contains the components (e.g., sand and water) of the recycle stream.

Aspect 8. The process of any one of Aspects 1 to 7B, performed on a continuous basis.

Aspect 9. The process of any one of Aspects 1 to 8, wherein a concentration of sand in the first mixture is greater than a concentration of sand in the second mixture.

Aspect 10. A system comprising: a hopper having an interior configured to contain a first mixture comprising sand and water, wherein the hopper has a hopper bottom outlet positioned on a bottom portion of the hopper; a recirculation chamber having an interior configured to contain a second mixture comprising sand and water, a first outlet positioned on a bottom portion of the recirculation chamber, and a second outlet positioned on the bottom portion of the recirculation chamber; a diffuser having a diffuser inlet fluidly coupled the hopper bottom outlet of the hopper and to the first outlet of the recirculation chamber, wherein the diffuser has a diffuser outlet; and a shaker device positioned at least partially below the diffuser and at least partially above the hopper.

Aspect 11. The system of Aspect 10, further comprising a continuous recirculation loop comprising: i) a first fluid path formed between the hopper and the recirculation chamber, ii) a second fluid path formed between the hopper and the diffuser, iii) a third fluid path formed between the recirculation chamber and the diffuser, iv) a fourth fluid path formed between the diffuser and the shaker device, and v) a fifth fluid path formed between the shaker device and the hopper.

Aspect 12. The system of Aspect 11, further comprising: a gas separator that receives a stream comprising sand, liquid, and gas and separates the gas from the sand and the liquid, wherein the gas separator has a slurry outlet fluidly coupled to the second outlet of the recirculation chamber and to a top opening of the hopper.

Aspect 13. The system of Aspect 12, further comprising: a first continuous recirculation loop comprising: i) a sixth fluid path formed between the recirculation chamber and the gas separator, ii) a seventh fluid path formed between the gas separator and the hopper, and iii) the first fluid path formed between the hopper and the recirculation chamber.

Aspect 14. The system of Aspect 12 or 13, further comprising: a slurry discharge line having an end coupled to the slurry outlet of the gas separator and an opposite end fluidly coupled with the top opening of the hopper.

Aspect 15. The system of any one of Aspects 10 to 14, further comprising: a pump having an inlet fluidly connected to the first outlet of the recirculation chamber and to the hopper bottom outlet, wherein the pump receives a first portion of the first mixture from the hopper and a first portion of the second mixture from the recirculation chamber, wherein the pump flows a combined mixture comprising the first portion of the first mixture and the first portion of the second mixture to an inlet of the diffuser.

Aspect 16. The system of Aspect 15, wherein the inlet of the diffuser is positioned on a bottom of the diffuser.

Aspect 17. The system of any one of Aspects 10 to 16, further comprising: a tank fluidly connected to the recirculation chamber, wherein the tank receives a second portion of the second mixture from the recirculation chamber into a third mixture that is contained in the tank, wherein a liquid obtained from the third mixture flows from the tank to a pit or to a fracturing fluid container.

Aspect 18. The system of any one of Aspects 10 to 17, wherein the first outlet of the recirculation chamber is positioned at a height above ground that is less than a height above ground at which the second outlet of the recirculation chamber is positioned.

Aspect 19. A process comprising: continuously recirculating sand and water in a first continuous recirculation loop, wherein the first continuous recirculation loop comprises: i) a first fluid path formed between a hopper and a recirculation chamber, ii) a second fluid path formed between the hopper and a diffuser, iii) a third fluid path formed between the recirculation chamber and the diffuser, iv) a fourth fluid path formed between the diffuser and a shaker device, and v) a fifth fluid path formed between the shaker device and the hopper.

Aspect 20. The process of Aspect 19, wherein continuously recirculating sand and water in the first continuous recirculation loop comprises: flowing a first portion of a first mixture contained in the hopper through the second fluid path; flowing a second portion of the first mixture in the first fluid path; flowing a first portion of a second mixture contained in the recirculation chamber in the third fluid path; flowing a combined mixture comprising the first portion of the first mixture and the first portion of the second mixture in the fourth fluid path; and flowing a shaker recycle liquid in the fifth fluid path.

Aspect 21. The process of Aspect 20, further comprising: continuously recirculating sand and water in a second continuous recirculation loop, wherein the second continuous recirculation loop comprises: i) a sixth fluid path formed between the recirculation chamber and a gas separator, ii) a seventh fluid path formed between the gas separator and the hopper, and iii) the first fluid path formed between the hopper and the recirculation chamber.

Aspect 22. The process of Aspect 21, wherein continuously recirculating sand and water in the second continuous recirculation loop comprises: flowing a second portion of the second mixture in the sixth fluid path; flowing a sand removal feed in the seventh fluid path; and flowing the second portion of the first mixture in the first fluid path.

Aspect 23. The process of Aspect 22, further comprising: receiving a stream comprising sand, liquid, and gas in the gas separator; continuously receiving the second portion of the second mixture from the recirculation chamber i) into the gas separator, ii) across a bottom discharge line of the gas separator, or iii) into the gas separator and across the bottom discharge line of the gas separator; while continuously receiving the second portion of the second mixture, separating the gas from the sand and liquid in the gas separator to form the sand removal feed; and flowing the sand removal feed to the hopper.

Aspect 24. A process for operating a recirculation chamber of a sand removal apparatus, wherein the sand removal apparatus comprises a hopper, a recirculation chamber, and a tank, the process comprising: receiving, by the recirculation chamber, a portion of a first mixture comprising sand and water that is contained in the hopper from the hopper into a second mixture comprising sand and water that is contained in a recirculation chamber; flowing a first portion of the second mixture from the recirculation chamber to a diffuser; flowing a second portion of the second mixture from the recirculation chamber to a gas separator; and optionally flowing a third portion of the second mixture from the recirculation chamber to the tank.

Aspect 25. A process comprising: flowing a stream comprising sand, liquid, and gas from a choke manifold to a hopper of a sand removal apparatus, and continuously recirculating sand and water in a first continuous recirculation loop of the sand removal apparatus, wherein the first continuous recirculation loop comprises: i) a first fluid path formed between the hopper and a recirculation chamber of the sand removal apparatus, ii) a second fluid path formed between the hopper and a diffuser of the sand removal apparatus, iii) a third fluid path formed between the recirculation chamber and the diffuser, iv) a fourth fluid path formed between the diffuser and a shaker device of the sand removal apparatus, and v) a fifth fluid path formed between the shaker device and the hopper.

Aspect 26. The process of Aspect 25, further comprising: continuously recirculating sand and water in a second continuous recirculation loop, wherein the second continuous recirculation loop comprises: i) a sixth fluid path formed between the recirculation chamber and a gas separator, ii) a seventh fluid path formed between the gas separator and the hopper, and iii) the first fluid path formed between the hopper and the recirculation chamber.

Aspect 27. A process comprising: flowing a stream comprising sand, liquid, and gas from a choke manifold to a hopper of a sand removal apparatus, wherein the stream is received into a first mixture contained in the hopper; flowing a first portion of the first mixture from the hopper to a diffuser of the sand removal apparatus; flowing a second portion of the first mixture from the hopper into a second mixture comprising sand and water that is contained in a recirculation chamber of the sand removal apparatus; flowing a first portion of the second mixture from the recirculation chamber to the diffuser; flowing a second portion of the second mixture to a gas separator; flowing a diffuser mixture comprising the first portion of the first mixture and the first portion of the second mixture from the diffuser to a shaker device; and flowing a shaker recycle liquid from the shaker device to the hopper.

Aspect 28. The process of Aspect 27, further comprising: flowing a recycle stream from the recirculation chamber to a gas separator; and receiving a sand removal feed into the first mixture of the hopper from the gas separator, wherein the sand removal feed contains the components (e.g., sand and water) of the recycle stream.

Aspect 29. A process for operating a sand removal apparatus, wherein the sand removal apparatus comprises one or more recirculation chambers and a tank, the process comprising: receiving, by the one or more recirculation chambers, a gas removal feed from a gas separator into a mixture comprising sand and water that is contained in the one or more recirculation chambers; flowing a first portion of the mixture from the one or more recirculation chamber to a diffuser; flowing a second portion of the mixture from the one or more recirculation chambers to the gas separator.

Aspect 30. The process of Aspect 29, further comprising flowing a third portion of the mixture from the one or more recirculation chambers to the tank.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A process comprising:
   receiving a sand removal feed comprising sand and water into a first mixture contained in a hopper;
   flowing a first portion of the first mixture from the hopper to a diffuser;
   flowing a second portion of the first mixture from the hopper into a second mixture comprising sand and water that is contained in a recirculation chamber;
   flowing a first portion of the second mixture from the recirculation chamber to the diffuser;
   flowing a second portion of the second mixture to a gas separator;
   flowing a diffuser mixture comprising the first portion of the first mixture and the first portion of the second mixture from the diffuser to a shaker device; and
   flowing a shaker recycle liquid from the shaker device to the hopper.

2. The process of claim 1, further comprising:
   flowing a third portion of the second mixture to a third mixture in a tank; and
   flowing a portion of the third mixture from the tank to a pit or to a fracturing fluid container.

3. The process of claim 1, wherein the hopper, the recirculation chamber, the diffuser, and the shaker device are connected to a mobile structure.

4. The process of claim 1, wherein flowing the first portion of the first mixture from the hopper to the diffuser and flowing the first portion of the second mixture from the recirculation chamber to the diffuser comprises:
   combining the first portion of the first mixture and the first portion of the second mixture to form a combined mixture; and
   pumping the combined mixture to the diffuser.

5. The process of claim 1, wherein the diffuser is located at least partially above the shaker device, wherein the shaker device is located at least partially above the hopper.

6. The process of claim 1, further comprising:
   shaking sand away from the shaker device to a location that is not above the hopper.

7. The process of claim 1, wherein the sand removal feed is continuously received from the gas separator.

8. The process of claim 1, wherein a concentration of sand in the first mixture is greater than a concentration of sand in the second mixture.

9. A system comprising:
   a hopper having an interior configured to contain a first mixture comprising sand and water, wherein the hopper has a hopper bottom outlet positioned on a bottom portion of the hopper;
   a recirculation chamber having an interior configured to contain a second mixture comprising sand and water, a first outlet positioned on a bottom portion of the recirculation chamber, and a second outlet positioned on the bottom portion of the recirculation chamber;
   a diffuser having a diffuser inlet fluidly coupled to the hopper bottom outlet of the hopper and to the first outlet of the recirculation chamber, wherein the diffuser has a diffuser outlet; and
   a shaker device positioned at least partially below the diffuser and at least partially above the hopper.

10. The system of claim 9, further comprising a first continuous recirculation loop comprising:
    i) a first fluid path formed between the hopper and the recirculation chamber;
    ii) a second fluid path formed between the hopper and the diffuser;
    iii) a third fluid path formed between the recirculation chamber and the diffuser;
    iv) a fourth fluid path formed between the diffuser and the shaker device; and
    v) a fifth fluid path formed between the shaker device and the hopper.

11. The system of claim 10, further comprising:
    a gas separator that receives a stream comprising sand, liquid, and gas and separates the gas from the sand and the liquid, wherein the gas separator has a slurry outlet fluidly coupled to the second outlet of the recirculation chamber and to a top opening of the hopper.

12. The system of claim 11, further comprising a second continuous recirculation loop comprising:
    i) a sixth fluid path formed between the recirculation chamber and the gas separator;
    ii) a seventh fluid path formed between the gas separator and the hopper; and
    iii) the first fluid path formed between the hopper and the recirculation chamber.

13. The system of claim 10, further comprising:
    a pump having an inlet fluidly connected to the first outlet of the recirculation chamber and to the hopper bottom outlet, wherein the pump receives a first portion of the first mixture from the hopper and a first portion of the second mixture from the recirculation chamber, wherein the pump flows a combined mixture comprising the first portion of the first mixture and the first portion of the second mixture to an inlet of the diffuser.

14. The system of claim 13, wherein the inlet of the diffuser is positioned on a bottom of the diffuser.

15. The system of claim 9, further comprising:
    a tank fluidly connected to the recirculation chamber, wherein the tank receives a second portion of the second mixture from the recirculation chamber into a third mixture that is contained in the tank, wherein a liquid obtained from the third mixture flows from the tank to a pit or to a fracturing fluid container.

16. The system of claim 9, wherein the first outlet of the recirculation chamber is positioned at a height above ground that is less than a height above ground at which the second outlet of the recirculation chamber is positioned.

17. A process comprising:
    continuously recirculating sand and water in a first continuous recirculation loop, wherein the first continuous recirculation loop comprises:
    i) a first fluid path formed between a hopper and a recirculation chamber;
    ii) a second fluid path formed between the hopper and a diffuser;
    iii) a third fluid path formed between the recirculation chamber and the diffuser;

iv) a fourth fluid path formed between the diffuser and a shaker device; and v) a fifth fluid path formed between the shaker device and the hopper;

wherein continuously recirculating sand and water in the first continuous recirculation loop comprises:

flowing a first portion of a first mixture contained in the hopper through the second fluid path;

flowing a second portion of the first mixture in the first fluid path;

flowing a first portion of a second mixture contained in the recirculation chamber in the third fluid path;

flowing a combined mixture comprising the first portion of the first mixture and the first portion of the second mixture in the fourth fluid path; and flowing a shaker recycle liquid in the fifth fluid path.

18. The process of claim 17, further comprising:

continuously recirculating sand and water in a second continuous recirculation loop, wherein the second continuous recirculation loop comprises:

i) a sixth fluid path formed between the recirculation chamber and a gas separator;

ii) a seventh fluid path formed between the gas separator and the hopper; and iii) the first fluid path formed between the hopper and the recirculation chamber;

wherein continuously recirculating sand and water in the second continuous recirculation loop comprises:

flowing a second portion of the second mixture in the sixth fluid path;

flowing a sand removal feed in the seventh fluid path; and flowing the second portion of the first mixture in the first fluid path.

19. The process of claim 18, further comprising:

receiving a stream comprising sand, liquid, and gas in the gas separator;

continuously receiving the second portion of the second mixture from the recirculation chamber i) into the gas separator, ii) across a bottom discharge line of the gas separator, or iii) into the gas separator and across the bottom discharge line of the gas separator;

while continuously receiving the second portion of the second mixture, separating the gas from the sand and liquid in the gas separator to form the sand removal feed; and flowing the sand removal feed to the hopper.

20. A process for operating a recirculation chamber of a sand removal apparatus, wherein the sand removal apparatus comprises a hopper, a recirculation chamber, and a tank, the process comprising:

receiving, by the recirculation chamber, a portion of a first mixture comprising sand and water that is contained in the hopper from the hopper into a second mixture comprising sand and water that is contained in the recirculation chamber;

flowing a first portion of the second mixture from the recirculation chamber to a diffuser;

flowing a second portion of the second mixture from the recirculation chamber to a gas separator; and optionally flowing a third portion of the second mixture from the recirculation chamber to the tank.

* * * * *